(12) United States Patent
Wright et al.

(10) Patent No.: US 10,259,204 B2
(45) Date of Patent: *Apr. 16, 2019

(54) RESILIENT FLOORING PRODUCT AND METHODS OF MAKING SAME

(71) Applicant: COLUMBIA INSURANCE COMPANY, Omaha, NE (US)

(72) Inventors: Jeffrey J. Wright, Cartersville, GA (US); John J. M. Rees, Chattanooga, TN (US); Tom Odum, Dalton, GA (US); Jean Briere, Ooltewah, TN (US); Jay Vecsey, Canton, GA (US); Mahesh Subramanian, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,215

(22) Filed: Feb. 19, 2016

(65) Prior Publication Data
US 2016/0340916 A1     Nov. 24, 2016

Related U.S. Application Data

(63) Continuation-in-part of application No. 13/971,472, filed on Aug. 20, 2013, now Pat. No. 9,359,773, which is a continuation of application No. 13/099,039, filed on May 2, 2011, now Pat. No. 8,859,085.
(Continued)

(51) Int. Cl.
*B32B 3/10* (2006.01)
*B32B 27/32* (2006.01)
(Continued)

(52) U.S. Cl.
CPC ............... *B32B 27/32* (2013.01); *B32B 3/30* (2013.01); *B32B 5/022* (2013.01); *B32B 5/024* (2013.01);
(Continued)

(58) Field of Classification Search
None
See application file for complete search history.

(56) References Cited

U.S. PATENT DOCUMENTS 3,450,563 A    6/1969   Krueger
3,741,851 A    6/1973   Erb et al.
(Continued)

FOREIGN PATENT DOCUMENTS

BE       1020391 A3    9/2013
CA       2479488 A1    2/2005
(Continued)

OTHER PUBLICATIONS

International Search Report and Written Opinion dated Aug. 4, 2016 for Application No. PCT/US2016/018652, which was filed on Feb. 19, 2016 and published as WO/2016/134243 on Aug. 25, 2016 (Inventor—Wright et al; Applicant—Shaw Industries Group, Inc.) (11 pages).
(Continued)

*Primary Examiner* — Christopher M Polley
(74) *Attorney, Agent, or Firm* — Ballard Spahr LLP

(57) ABSTRACT

Described herein are resilient floor coverings made from non-vinyl materials and methods for manufacturing same. This abstract is intended as a scanning tool for purposes of searching in the particular art and is not intended to be limiting of the present invention.

44 Claims, 9 Drawing Sheets

Related U.S. Application Data

(60) Provisional application No. 61/330,006, filed on Apr. 30, 2010, provisional application No. 62/118,764, filed on Feb. 20, 2015.

(51) Int. Cl.

| | | |
|---|---|---|
| *E04F 15/10* | (2006.01) | |
| *B32B 37/12* | (2006.01) | |
| *B32B 5/26* | (2006.01) | |
| *B32B 25/08* | (2006.01) | |
| *B32B 27/08* | (2006.01) | |
| *B32B 27/12* | (2006.01) | |
| *B32B 5/02* | (2006.01) | |
| *B32B 7/12* | (2006.01) | |
| *B32B 27/10* | (2006.01) | |
| *B32B 27/20* | (2006.01) | |
| *B32B 27/28* | (2006.01) | |
| *B32B 27/30* | (2006.01) | |
| *B32B 27/40* | (2006.01) | |
| *B32B 29/00* | (2006.01) | |
| *B32B 3/30* | (2006.01) | |
| *E04F 15/16* | (2006.01) | |

(52) U.S. Cl.
CPC ............. *B32B 5/26* (2013.01); *B32B 7/12* (2013.01); *B32B 25/08* (2013.01); *B32B 27/08* (2013.01); *B32B 27/10* (2013.01); *B32B 27/12* (2013.01); *B32B 27/20* (2013.01); *B32B 27/28* (2013.01); *B32B 27/306* (2013.01); *B32B 27/308* (2013.01); *B32B 27/40* (2013.01); *B32B 29/002* (2013.01); *B32B 37/12* (2013.01); *E04F 15/105* (2013.01); *E04F 15/107* (2013.01); *B32B 2255/10* (2013.01); *B32B 2255/26* (2013.01); *B32B 2262/0253* (2013.01); *B32B 2262/0261* (2013.01); *B32B 2262/0276* (2013.01); *B32B 2262/101* (2013.01); *B32B 2264/067* (2013.01); *B32B 2264/10* (2013.01); *B32B 2272/00* (2013.01); *B32B 2274/00* (2013.01); *B32B 2307/4023* (2013.01); *B32B 2307/41* (2013.01); *B32B 2307/514* (2013.01); *B32B 2307/554* (2013.01); *B32B 2307/718* (2013.01); *B32B 2307/732* (2013.01); *B32B 2307/75* (2013.01); *B32B 2419/04* (2013.01); *B32B 2451/00* (2013.01); *B32B 2471/00* (2013.01); *E04F 15/163* (2013.01); *Y10T 156/10* (2015.01); *Y10T 428/24802* (2015.01); *Y10T 428/24851* (2015.01); *Y10T 428/24868* (2015.01); *Y10T 428/24876* (2015.01); *Y10T 428/24901* (2015.01)

(56) References Cited

U.S. PATENT DOCUMENTS

| | | |
|---|---|---|
| 3,844,814 A | 10/1974 | Bettoli et al. |
| 3,887,678 A | 6/1975 | Lewicki, Jr. |
| 3,978,258 A | 8/1976 | Faust et al. |
| 4,005,239 A | 1/1977 | Davis et al. |
| 4,083,821 A | 4/1978 | Harris |
| 4,083,824 A | 4/1978 | Harris |
| 4,196,243 A | 4/1980 | Sachs et al. |
| 4,278,483 A | 7/1981 | Mansolillo |
| 4,310,370 A | 1/1982 | Arai et al. |
| 4,390,580 A | 6/1983 | Donovan et al. |
| 4,781,987 A | 11/1988 | Bolgiano et al. |
| 5,284,889 A | 2/1994 | Pyun et al. |
| 5,494,707 A | 2/1996 | Wang et al. |
| 5,728,476 A | 3/1998 | Harwood et al. |
| 5,830,937 A | 11/1998 | Shalov et al. |
| 6,114,008 A | 9/2000 | Eby et al. |
| 6,319,349 B1 | 11/2001 | Lin |
| 6,555,216 B2 | 4/2003 | Chen et al. |
| 6,579,610 B1 | 6/2003 | Shortland et al. |
| 6,635,341 B1 | 10/2003 | Barancyk et al. |
| 6,649,257 B1 | 11/2003 | Satz |
| 6,753,065 B2 | 6/2004 | Okuyama |
| 6,753,066 B2 | 6/2004 | Eby et al. |
| 7,014,802 B1 | 3/2006 | Eby et al. |
| 7,029,744 B2 | 4/2006 | Horstman et al. |
| 7,172,809 B2 | 2/2007 | Barancyk et al. |
| 7,175,904 B2 | 2/2007 | Oshilaja et al. |
| 7,223,813 B2 | 5/2007 | Buckmann et al. |
| 7,384,697 B2 | 6/2008 | Chen et al. |
| 7,419,717 B2 | 9/2008 | Chen et al. |
| 7,715,904 B2 | 5/2010 | Maki et al. |
| 8,859,085 B2 | 10/2014 | Hahn et al. |
| 2001/0036557 A1 | 11/2001 | Ingrim et al. |
| 2003/0208980 A1 | 11/2003 | Miller et al. |
| 2004/0039089 A1 | 2/2004 | Buckmann et al. |
| 2004/0062903 A1* | 4/2004 | Evans, Jr. ........... B29C 44/1209 428/95 |
| 2005/0048277 A1 | 3/2005 | Oshilaja et al. |
| 2005/0069681 A1 | 3/2005 | Wright et al. |
| 2006/0216471 A1 | 9/2006 | Grah et al. |
| 2007/0104908 A1 | 5/2007 | Driscoll et al. |
| 2008/0206538 A1 | 8/2008 | Katayama et al. |
| 2008/0206583 A1* | 8/2008 | Phan ........................ B32B 7/12 428/523 |
| 2008/0261000 A1 | 10/2008 | White et al. |
| 2008/0280093 A1 | 11/2008 | Bieser et al. |
| 2009/0022662 A1 | 1/2009 | Young et al. |
| 2009/0239060 A1 | 9/2009 | Tomino |
| 2010/0297394 A1* | 11/2010 | Peace ..................... C09K 3/149 428/145 |
| 2011/0258933 A1 | 11/2011 | Hahn et al. |
| 2011/0268933 A1 | 11/2011 | Hahn et al. |

FOREIGN PATENT DOCUMENTS

| | | |
|---|---|---|
| CN | 102277945 A | 12/2011 |
| DE | 102005023661 | 11/2006 |
| EP | 2080629 A2 | 7/2009 |
| GB | 2462167 A | 2/2010 |
| JP | H08312117 A | 11/1996 |
| JP | 2000026620 A | 1/2000 |
| JP | 2000108292 A | 4/2000 |
| JP | 2001030455 A | 2/2001 |
| JP | 2001055826 A | 2/2001 |
| JP | 2001517112 A | 10/2001 |
| JP | 2002052680 A | 2/2002 |
| JP | 2002059512 A | 2/2002 |
| JP | 2003011305 A | 1/2003 |
| JP | 2003089765 A | 3/2003 |
| JP | 2003340977 A | 12/2003 |
| JP | 2004225387 A | 8/2004 |
| JP | 2004300758 A | 10/2004 |
| JP | 2005344247 A | 12/2005 |
| JP | 2006007688 A | 1/2006 |
| JP | 2006088349 A | 4/2006 |
| JP | 2006123235 A | 5/2006 |
| JP | 2007181988 A | 7/2007 |
| JP | 2011236733 A | 11/2011 |
| KR | 20110121596 A | 11/2011 |
| WO | WO-95/11333 A1 | 4/1995 |
| WO | WO-97/10396 A1 | 3/1997 |
| WO | WO-98/38376 A1 | 9/1998 |
| WO | WO-2008/029105 A2 | 3/2008 |
| WO | WO 2008029105 A2 * | 3/2008 ............. C09K 3/149 |
| WO | WO-2016/134243 | 8/2016 |

OTHER PUBLICATIONS

Restriction Requirement dated Aug. 1, 2013 U.S. Appl. No. 13/099,039, filed May 2, 2011 and now U.S. Pat. No. 8,859,085 (Inventor: Hahn et al.// Applicant: Shaw Industries Group//) (7 pages).

(56) References Cited

OTHER PUBLICATIONS

Response to Restriction Requirement filed Aug. 20, 2013 for U.S. Appl. No. 13/099,039, filed May 2, 2011 and now U.S. Pat. No. 8,859,085 (Inventor: Hahn et al.// Applicant: Shaw Industries Group//) (3 pages).
Non Final Office Action dated Oct. 24, 2013 for U.S. Appl. No. 13/099,039, filed May 2, 2011 and now U.S. Pat. No. 8,859,085 (Inventor: Hahn et al.// Applicant: Shaw Industries Group//) (9 pages).
Response to Non Final Office Action filed Jan. 24, 2014 for U.S. Appl. No. 13/099,039, filed May 2, 2011 and now U.S. Pat. No. 8,859,085 (Inventor: Hahn et al.// Applicant: Shaw Industries Group//) (9 pages).
Response to Ex Parte Quale Office Action filed May 28, 2014 for U.S. Appl. No. 13/099,039, filed May 2, 2011 and now U.S. Pat. No. 8,859,085 (Inventor: Hahn et al.// Applicant: Shaw Industries Group//) (7 pages).
Ex Parte Quale Office Action filed May 28, 2014 for U.S. Appl. No. 13/099,039, filed May 2, 2011 and now U.S. Pat. No. 8,859,085 (Inventor: Hahn et al.// Applicant: Shaw Industries Group//) (4 pages).
Notice of Allowance dated Jun. 24, 2014 for U.S. Appl. No. 13/099,039, filed May 2, 2011 and now U.S. Pat. No. 8,859,085 (Inventor: Hahn et al.// Applicant: Shaw Industries Group//) (7 pages).
Supplemental Notice of Allowance dated Sep. 12, 2014 for U.S. Appl. No. 13/099,039, filed May 2, 2011 and now U.S. Pat. No. 8,859,085 (Inventor: Hahn et al.// Applicant: Shaw Industries Group//) (2 pages).
Issue Notification dated Sep. 4, 2014 for U.S. Appl. No. 13/099,039, filed May 2, 2011 and now U.S. Pat. No. 8,859,085 (Inventor: Hahn et al.// Applicant: Shaw Industries Group//) (1 page).
Notice of Allowance dated May 28, 2015 for U.S. Appl. No. 13/971,472, filed Aug. 20, 2013 and now U.S. Pat. No. 9,359,773 (Inventor: Hahn et al.// Applicant: Shaw Industries Group//) (13 pages).
Notice of Allowance dated Feb. 1, 2016 for U.S. Appl. No. 13/971,472, filed Aug. 20, 2013 and now U.S. Pat. No. 9,359,773 (Inventor: Hahn et al.// Applicant: Shaw Industries Group//) (11 pages).
Issue Notification dated May 18, 2016 for U.S. Appl. No. 13/971,472, filed Aug. 20, 2013 and now U.S. Pat. No. 9,359,773 (Inventor: Hahn et al.// Applicant: Shaw Industries Group//) (1 page).

* cited by examiner

RESILIENT FLOORING PRODUCT AND METHODS OF MAKING SAME

CROSS-REFERENCE TO RELATED APPLICATIONS

This application claims the benefit of U.S. Provisional Application No. 62/118,764, filed Feb. 20, 2015. This application is also a Continuation-in-Part of U.S. application Ser. No. 13/971,472, filed Aug. 20, 2013, which is a Continuation of U.S. application Ser. No. 13/099,039, filed May 2, 2011, now U.S. Pat. No. 8,859,085, issued Oct. 14, 2014, which claims the benefit of U.S. Provisional Application No. 61/330,006, filed Apr. 30, 2010. Each of the above-identified applications is hereby incorporated herein by references in its entirety.

FIELD

In one aspect, the invention relates to a resilient floor covering, and more particularly, to a non-vinyl resilient flooring product.

BACKGROUND

Conventional resilient floor coverings are typically produced in the form of a continuous sheet or in the form of a tile. Resilient sheet flooring typically comprises a bottom, thermally stable base or matte layer coated with one or more layers of similarly formulated polymeric compounds. For aesthetic purposes, an ink layer is also typically disposed between the polymeric layers and the polymeric layers may optionally be chemically or mechanically embossed. Similarly, resilient tile flooring is typically formed as a composite laminated structure having a base layer, a decorative layer applied on top of the base layer, a protective film layer disposed on top of the decorative layer, and a top coat disposed on top of the protective film layer. For aesthetic purposes, the tile may also be mechanically embossed to impart a desired surface texture or pattern.

Currently, conventional resilient sheet and tile floorings both utilize vinyl polymers, such as polyvinyl chloride plastisols, polyvinylchloride homopolymers, and polyvinylchloride acetate resin, as a primary component in the various base and composite layers described above. However, these conventional vinyl flooring systems have several known drawbacks. For example, the long term appearance of an installed resilient floor is dependent on its dimensional stability which refers to the ability of the tile or sheet to retain its original dimension and resist shrinkage over the usable service life of the flooring. To that end, conventional vinyl polymers are incapable of providing the necessary dimensional stability needed to preserve an acceptable long term appearance and service life of an installed resilient floor. In an effort to improve dimensional stability, various chemical stabilizers and fiber based additives including synthetic fibers, fillers, binders, resin, and glass have been incorporated into these polymer systems. Unfortunately however, these additives and stabilizers also result in an increased cost of the end product. However, increasing filler concentration not only increases dimensional stability but is also a recognized means for enhancing fire suppression, thermal insulation, and sound dampening properties of the floor covering as well. Unfortunately, vinyl polymers are known to have limited flexural and impact resistance properties as the concentration of additives, such as fillers and fibers, is increased.

Still further, the installation of resilient flooring typically requires the use of an adhesive material for securing the floor covering to the underlying subfloor structure. Many conventional commercially available adhesive materials are chemically incompatible with vinyl polymers and will in some instances not provide the necessary adhesion. In even more extreme cases, certain adhesives will chemically react with the vinyl polymers resulting in a complete degradation of the resilient flooring. Thus, it has become necessary to provide specially formulated adhesive materials that are chemically compatible with conventional vinyl resilient floor coverings that will not degrade over time. Understandably, this too creates added installation expenses that would be desirable to avoid. Further, in many cases, incompatible adhesives are present on an existing floor and need to be removed or a sealant must be applied in order to achieve acceptable adhesion to vinyl flooring.

Resilient flooring also has a limited lifespan and must eventually be replaced, with the resultant used flooring generally being sent to landfill. The vast quantities of flooring waste that are generated annually are burdensome to landfill capacity and have a negative impact on the environment. To reduce the impact of used resilient flooring on the environment, and to reclaim some of the financial loss due to discarding of useful material waste, resilient flooring recycling would appear to be a logical solution. Additionally, the cost of regrinding and re-compounding these resins are generally prohibitive when compared to the significantly lower cost of virgin vinyl resins.

Lastly, and perhaps most importantly, there are significant public health and safety concerns associated with the use of vinyl polymer systems in resilient floor covering systems. As noted above, vinyl flooring products often contain additional chemicals to change the chemical or physical properties of the product. For example, phthalate plasticizers have traditionally been added to make PVC systems more flexible. There are concerns that these additives can leach out of the vinyl products over time. Additionally, there are concerns that vinyl flooring can over time release harmful chemical gases into the air, especially when burned. Some studies indicate that this outgassing may contribute to health complications. In view of these concerns, certain jurisdictions are now considering legislation that would ban the use of certain vinyl polymers, such as PVC, in various consumer goods due to the threats it poses to human and environmental health.

In view of these drawbacks, some in the flooring industry have begun seeking suitable replacements for conventional vinyl systems in the manufacture of resilient floor coverings. One alternative is the use of ordinary thermoplastic polyolefins.

Various methods are available for applying polyolefin backing materials, including powder coating, hot melt application and extruded film or sheet lamination. However, using ordinary polyolefins can also present difficulties. For example, ordinary polyolefin resins possess inadequate adhesion for use in resilient flooring construction. Additionally, ordinary polyolefins have relatively high application viscosities and relatively high thermal requirements. That is, ordinary thermoplastic polyolefins are characterized by relatively high melt viscosities and high recrystallization or solidification temperatures. Even ordinary elastomeric polyolefins, i.e. polyolefins having low crystallinities, generally have relatively high viscosities and relatively high recrystallization temperatures.

One method for overcoming the viscosity and recrystallization deficiencies of ordinary polyolefins is to formulate the polyolefin resin as a hot melt which usually involves formulating low molecular weight polyolefins with waxes, tackifiers, various flow modifiers and/or other elastomeric materials. Unfortunately, hot melt systems can require considerable formulating and yet often yield inadequate delamination strengths. However, the most significant deficiency of typical hot melt system is their melt strengths which are generally too low to permit application by a direct extrusion coating technique. As such, polyolefin hot melt systems are typically applied by relatively slow, less efficient techniques such as by the use of heated doctor blades or rotating melt transfer rollers.

While unformulated high pressure low density polyethylene (LDPE) can be applied by a conventional extrusion coating technique, LDPE resins typically have poor flexibility which can result in excessive stiffness. Conversely, those ordinary polyolefins that have improved flexibility, such as ultra low density polyethylene (ULDPE), still do not possess sufficient flexibility, have excessively low melt strengths and/or tend to draw resonate during extrusion coating. To overcome extrusion coating difficulties, ordinary polyolefins with sufficient flexibility can be applied by lamination techniques; however, lamination techniques are typically expensive and can result in extended production rates relative to direct extrusion coating techniques.

There remains a need for resilient floor coverings that do not contain vinyl polymers. In other words, it would be desirable to provide a non-vinyl resilient floor covering that can be manufactured in a manner and with equipment similar to that used to manufacture conventional vinyl resilient flooring. There similarly remains a need for a non-vinyl resilient flooring that provides dimensional stability and adequate flexural and impact resistance properties, irrespective of the concentration of inorganic filler that may be present. Still further, there is a need for non-vinyl resilient flooring capable of being recycled with greater ease than conventional vinyl flooring products. Lastly, there is also a need for a non-vinyl resilient flooring that is regarded as safe without any associated health and public safety concerns for the environment.

SUMMARY

In accordance with the purpose(s) of the invention, as embodied and broadly described herein, the invention, in one aspect, relates to non-vinyl resilient floor coverings.

In an exemplary aspect, disclosed herein is a resilient floor covering, comprising: a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler; a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering, wherein the wear layer exhibits an abrasion resistance greater than 5000 cycles when measured according to ASTM D3884 under testing conditions comprising an H18 wheel, 1000 gram load, and clean each 300 cycles; wherein the exposed outer surface of the wear layer exhibits a micro-scratch resistance characterized by of a gloss change rating in the range of 1 to 3 when measured pursuant to Martindale Test EN 16094-2012 Test A (MSR-A) or Test B (MSR-B) visual assessment of surface scratching; and wherein the resilient floor covering does not comprise vinyl polymer material.

In another exemplary aspect, disclosed herein is a resilient floor covering, comprising: a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler; a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering, wherein the resilient floor covering exhibits a short term residual indentation depth in the range of from 0 inches to 0.09 inches as measured pursuant to ASTM F1914 under conditions of: 140 lb. load for 10 minutes, recover of 60 minutes; and wherein the resilient floor covering does not comprise vinyl polymer material.

In another exemplary aspect, disclosed herein is a resilient floor covering, comprising: a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler; a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer, and a wear layer having an exposed outer surface portion configured for exposure to the ambient environment and an opposed bottom surface configured to substantially overlie the decorative portion of the floor covering, wherein the exposed outer surface portion of the wear layer further comprises a scratch layer; and wherein the resilient floor covering does not comprise vinyl polymer material.

In another exemplary aspect, disclosed herein is a resilient floor covering, comprising: a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler; a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering, wherein the resilient floor covering exhibits a dimensional stability of less than about 0.17% as determined by ASTM F2199-0 at 82° C. and 24 hrs; and wherein the resilient floor covering does not comprise vinyl polymer material.

Also disclosed herein are methods for making the disclosed resilient floor coverings.

BRIEF DESCRIPTION OF THE FIGURES

These and other features of the preferred embodiments of the invention will become more apparent in the detailed description in which reference is made to the appended drawings wherein.

DETAILED DESCRIPTION

Figure 1:
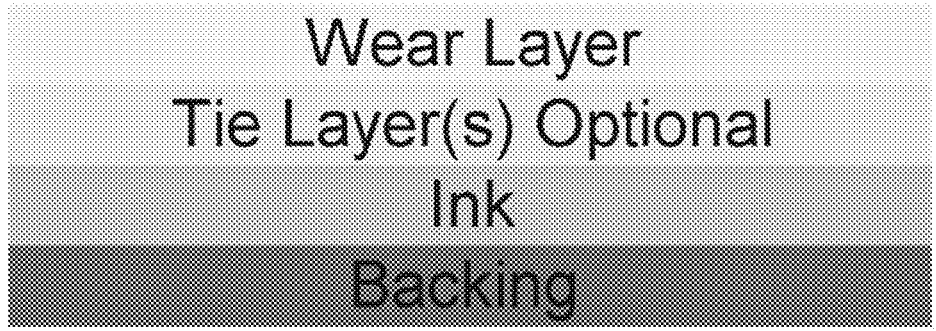
FIG. 1 depicts an exemplary structure of the non-vinyl resilient flooring product according to the present invention.

The present invention can be understood more readily by reference to the following detailed description, examples, drawing, and claims, and their previous and following description. However, before the present articles, devices, systems, and/or methods are disclosed and described, it is to be understood that this invention is not limited to the specific articles, devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used throughout, the singular forms "a," "an" and "the" include plural referents unless the context clearly dictates otherwise. Thus, for example, reference to "a layer" can include two or more such layers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

Resilient Floor Covering

In various aspects, the present invention relates to resilient floor coverings. In one aspect, the invention relates to a resilient floor covering configured for placement on a floor in a selected orientation. In a further aspect, and with reference to FIG. 1, the resilient floor covering can comprise a backing portion, a decorative portion, and a wear layer. In a still further aspect, the resilient floor covering can optionally comprise at least one tie layer. In a yet further aspect, the resilient floor covering does not comprise vinyl polymer material.

In one aspect, the resilient floor covering can comprise: a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer and a wear layer having an exposed outer surface portion configured for exposure to the ambient environment and an opposed bottom surface configured to substantially overlie the decorative portion of the floor covering. In another aspect, the exposed outer surface portion of the wear layer can further comprise a scratch layer.

Backing Portion

In one aspect, the backing portion of the resilient floor covering can have a bottom surface and an opposing top surface. In this aspect, the bottom surface of the backing portion can be configured to substantially abut the floor when the resilient floor covering is placed in the selected orientation. In another aspect, the backing portion can comprise at least one backing layer. It is contemplated that a backing layer of the at least one backing layer can define the bottom surface of the backing portion. It is further contemplated that a backing layer of the at least one backing layer can define the top surface of the backing portion. In some aspects, the at least one backing layer can comprise a single backing layer. In other aspects, the at least one backing layer can comprise a plurality of backing layers.

In one aspect, the at least one backing layer of the backing portion can comprise one or more first backing layers and a secondary backing layer. For example, in a further aspect, the at least one backing layer of the backing portion can comprise a first backing layer, a second backing layer, and a secondary backing layer. In a still further aspect, the secondary backing layer can define the bottom surface of the backing portion, and the first and second backing layers can be configured to substantially overlie the secondary backing layer.

Figure 2:
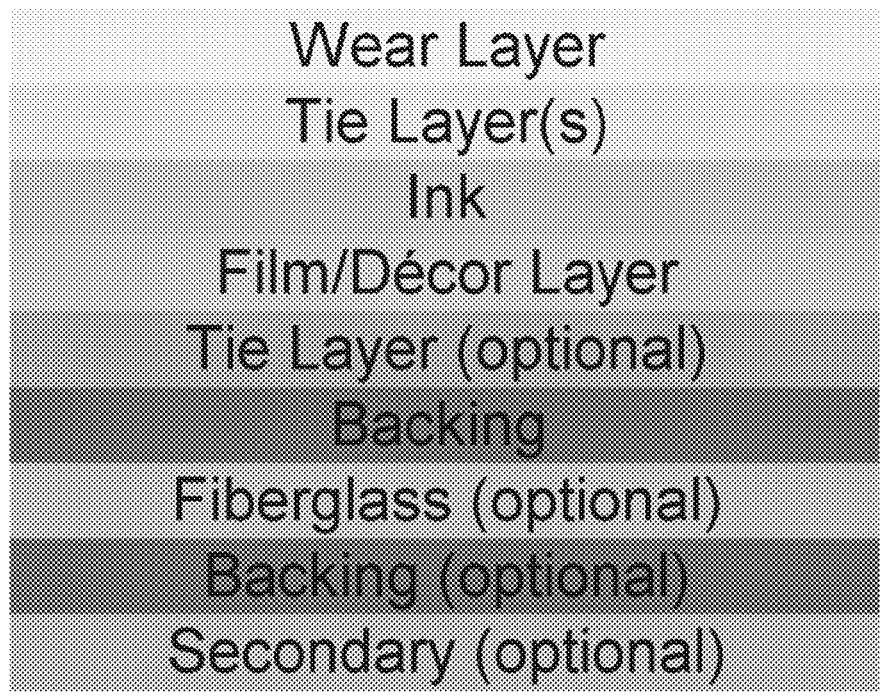
FIG. 2 depicts an exemplary structure of the non-vinyl resilient flooring product according to the present invention.

In an exemplary aspect, as shown in FIG. 2, the one or more backing layers formed from the backing composition can comprise a first backing layer and a second backing layer. In this aspect, the first backing layer can define the top surface of the backing portion. In a further aspect, the backing portion can optionally comprise a fiberglass layer positioned therebetween the first and second backing layers. Without wishing to be bound by a particular theory, the fiberglass layer can increase dimensional stability by reducing the chance for shrinkage or growth after installation of the flooring product.

In various further aspects, the one or more backing layers are formed from and comprise a backing composition. In one aspect, the first and second backing layers comprise a backing composition. In some aspects, the first and second backing layers can comprise the same backing composition. In other aspects, the first and second backing layers can comprise different backing compositions.

In one aspect, the backing composition comprises a polyolefin elastomer and a filler. In a further aspect, the backing composition can comprise, for example and without limitation, low-density polyethylene (LDPE), linear low-density polyethylene (LLDPE), ethylene methacrylate (EMA), ethylene vinyl acetate (EVA), polyethylene-polypropylene (PE-PP) rubber, conventional thermoplastic elastomers (TPEs), conventional thermoplastic olefins (TPOs), alpha-olefin polyethylene copolymers, polyethylene terephthalate (PET), ethylene butyl acrylate (EBA), and the like. In a still further aspect, the backing composition comprises a ethylene-octene copolymer.

In a further aspect, and as disclosed in U.S. patent application Ser. No. 11/963,263, which is incorporated in its entirety by reference herein, the backing composition can comprise substantially linear ethylene polymers and homogeneously branched linear ethylene polymers (i.e., homogeneously branched ethylene polymers), which offer low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). Exemplary backing layers formed from the disclosed homogeneously branched ethylene polymers are shown in the figures as first or second backing layers.

In a further aspect, the use of substantially linear ethylene polymers in the backing layer of the floor covering can allow the elimination of secondary backing materials and as such can result in significant manufacturing cost savings. In addition, floor covering having a substantially linear ethylene polymer or homogeneously branched linear ethylene polymer layer can provide a substantial fluid and particle barrier which enhances the hygienic properties of the floor covering.

In a further aspect, the homogeneously branched ethylene polymer of the backing composition can be used alone or can be blended or mixed with one or more synthetic or natural polymeric material. Suitable polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra-low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In one aspect, the polyolefin elastomer comprises a polyethylene elastomer. In a further aspect, the polyolefin elastomer comprises a polypropylene elastomer. In a yet further aspect, the polyolefin elastomer is a copolymer of propylene and ethylene. In an even further aspect, the propylene content of the copolymer is at least about 80%.

In one aspect, the backing composition comprises from about 10 to about 50 wt % polymer based on the total weight of the backing composition, including exemplary polymer weight % of 15% by weight, 20% by weight, 30% by weight, 35% by weigh, 40% by weight, and 45% by weight. In a still further aspect, the backing composition can comprise polymer in an amount in any range derived from the above values. For example, the polymer weight % can range from about 10% to about 40% by weight, or from about 15% to about 45% by weight.

In another aspect, the polymer can comprise from about 50% to about 100% by weight polyolefin based on the total weight of polymer, including exemplary values of 55% by weight, 60% by weight, 65% by weight, 70% by weight, 71% by weight, 72% by weight, 73% by weight, 74% by weight 75% by weight, 76% by weight, 77% by weight, 78% by weight, 79% by weight, 80% by weight, 85% by weight, 90% by weight, and 95% by weight. In still further aspects, the polymer can comprise polyolefin in a range derived from any two of the above listed exemplary weight percentage values. For example, the the polymer can comprise from about 51% to about 99% by weight polyolefin, or about 60% to about 90% by weight polyolefin based on the total weight of polymer.

In various aspects, the exemplary polyolefin elastomer offers excellent physical properties including elasticity, toughness, and low temperature ductility and high filler loading capability. In one exemplary aspect, the polyolefin elastomer is an ethylene-octene copolymer such as, for example and not meant to be limiting, ENGAGE™ EG 8185 polyolefin elastomer (an ethylene-octene copolymer available from The Dow Company having a density of about 0.885 g/cm$^3$ (ASTM D-792), a melt index of about 30 g/10 min, as determined according to ASTM D-1238 at 190° C. and 2.16 kg, and a Mooney viscosity of about 33, as determined according to ASTM D-1546 at ML 1+4 at 121° C.), ENGAGE™ EG 8100 polyolefin elastomer (an ethylene-octene copolymer available from The Dow Company having a density of about 0.870 g/cm$^3$ (ASTM D-792), a melt index of about 1.0 g/10 min, as determined according to ASTM D-1238 at 190° C. and 2.16 kg, and a Mooney viscosity of about 23, as determined according to ASTM D-1546 at ML 1+4 at 121° C.), AFFINITY™ KC8852G polyolefin elastomer (an ethylene-octene copolymer available from The Dow Company having a density of about 0.875 g/cm$^3$ (ASTM D-792), and a melt index of about 3.0 g/min, as determined according to ASTM D-1238 at 190° C. and 2.16 kg).

In a further aspect, the backing composition used to prepare at least one of the backing layers of the present invention comprise a filler. As would be recognized by one of ordinary skill in the art, the type of filler used will be selected on the basis of the desired physical properties of the final product. In a still further aspect, exemplary fillers can include, for example and without limitation, calcium carbonate, barium sulfate, barite, glass fiber and powder, metal powder, alumina, hydrated alumina, clay, magnesium carbonate, calcium sulfate, silica or glass, fumed silica, talc, carbon black or graphite, fly ash, cement dust, feldspar, nepheline, magnesium oxide, zinc oxide, aluminum silicate, calcium silicate, titanium dioxide, titanates, wood flour, glass microspheres, chalk, and mixtures thereof. In a yet further aspect, additional fillers that can be used include graphite fiber, silica/glass, wollastonite, crushed glass cullet, kaolin, mica, recycled fines, fiberglass, diatomaceous earth, lime, and mixtures thereof. In an even further aspect, an exemplary filler is fly ash, such as, for example and without limitation, Celceram™ fly ash filler PV20A (a calcium aluminum silicate available from Boral). In a further aspect, the backing composition can comprise post-industrial carpet and/or post-consumer carpet material. In a still further aspect, the backing composition can comprise composites of post-industrial carpet and/or composites of post-consumer carpet. In some aspects, the glass filler is glass fines or crushed glass cullet. In other aspects, the fly ash is coal fly ash.

In a further aspect, the backing composition can comprise a filler in an amount of from about 65% to about 95% by weight, including exemplary filler weight % values of 70% by weight, 71% by weight, 72% by weight, 73% by weight, 74% by weight 75% by weight, 76% by weight, 77% by weight, 78% by weight, 79% by weight, 80% by weight, 85% by weight, 90% by weight, and 94% by weight. In still further aspects, the backing composition can comprise a filler in an amount in a range derived from any two of the above listed exemplary weight percentage values. For example, the backing composition can comprise a filler in a range of from about 70% to about 90% by weight, or from about 75% to about 85% by weight. In one aspect, the backing composition comprises a 80% filled polyethylene composition. In another aspect, the backing composition comprises a 80% filled ethylene-octene copolymer composition.

In a further aspect, the backing composition of the present invention can optionally comprise one or more additives, for example and without limitation, tacfiers, processing agents, foaming agents, plasticizers, or the like. In a still further aspect, the additive can comprise a hydrocarbon resin. In one aspect, the hydrocarbon resin can be PICCOTAC™ 1115, which is manufactured by Eastman Chemical, and which is a relatively high molecular weight, aliphatic C5 resin derived from dienes and other reactive olefin.

In a further aspect, the backing composition can optionally include maleic anhydride grafts wherein maleic anhydride is grafted onto an ethylene polymer at a concentration of about 0.1 to about 5.0 weight percent, preferably about 1 to about 2 weight percent. In a still further aspect, an exemplary composition for forming a maleic anhydride graft is Amplify® GR 204 resin available from Dow Chemicals.

In a further aspect, the secondary backing layer, when present, can comprise, for example and without limitation, oriented polypropylene (OPP), woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, and the like. In a still further aspect, the secondary backing layer can comprise nonwoven fiberglass, woven fiberglass, recycled fiber shoddy, polyethylene terephthalate (PET) film, polypropylene (PP) film, polyethylene (PE) film, linear low-density polyethylene (LLDPE) film, polystyrene copolymer, polypropylene-polyethylene (PP-PE) copolymer, polyolefin elastomer, or polyurethane, or a combination thereof. In a still further aspect, the secondary backing layer comprises an embossed pattern.

Figure 7:
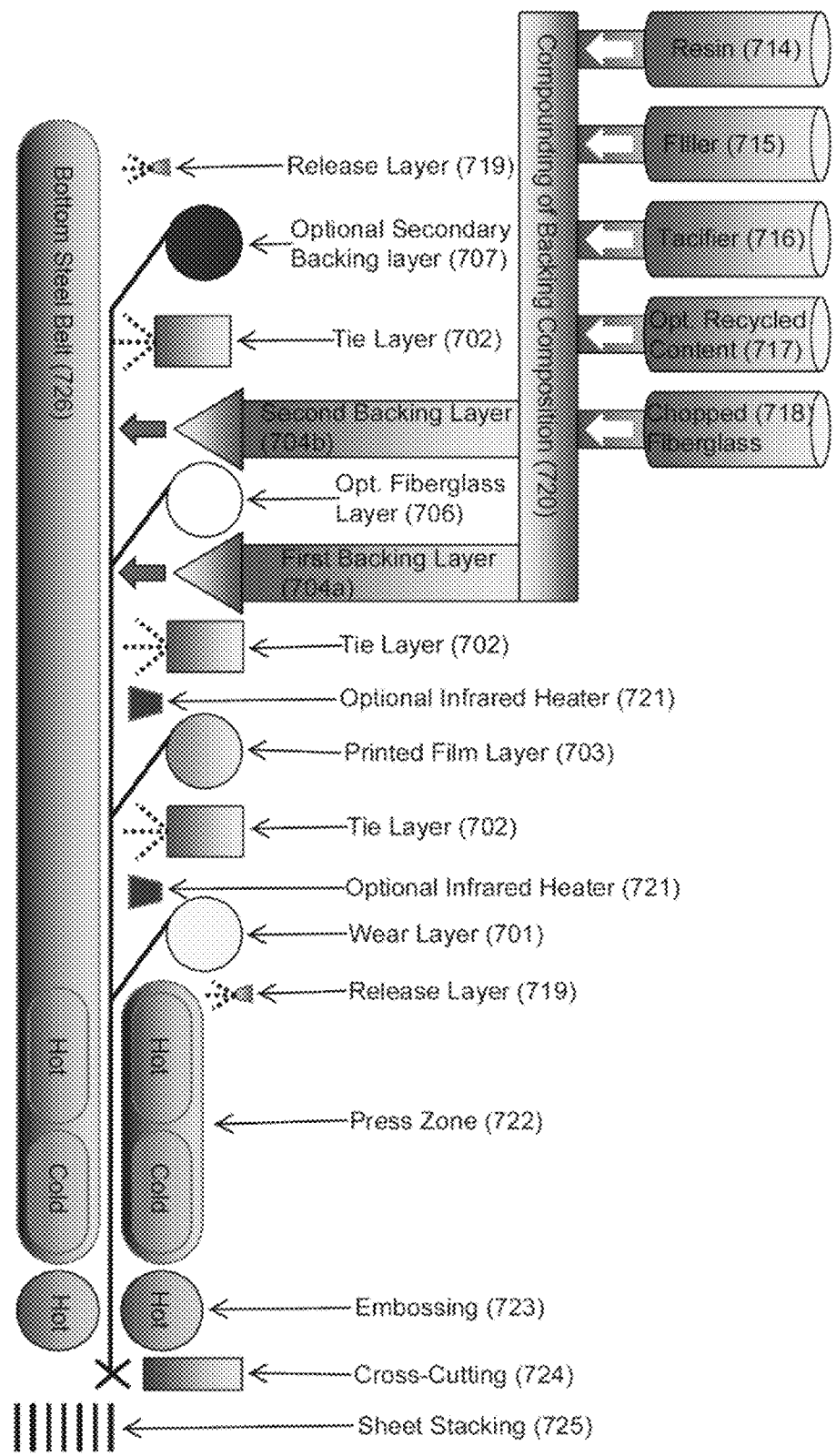
FIG. 7 depicts an exemplary manufacturing methodology for producing the non-vinyl resilient flooring products of the present invention.

In a further aspect, the fiberglass layer, when present, can comprise a fiberglass mat. In a still further aspect, the fiberglass layer can comprise a weight of from about 20 to about 90 g/m$^2$, including exemplary values of about 30, 40, 50, 60, 70, or 80 g/m$^2$. In some aspects, the fiberglass mat can allow for increased binder polymer saturation and, thus, a reduction in the chance for delamination from highly filled first and second backing layers. In a further aspect, beneficially, a thinner fiberglass mat can reduce the overall weight of the final flooring product and is less expensive than thicker fiberglass. In other aspects, as shown in FIG. 7, the backing layer formed from the backing composition can also comprise fiberglass, for example, chopped fiberglass. Thus, in one aspect, the resilient flooring would not require a separate fiberglass layer.

Decorative Portion

According to aspects of the invention, the resilient floor covering comprises a decorative portion. In one aspect, the decorative portion can have a bottom surface and an opposed top surface. In a further aspect, the decorative portion can comprise an ink layer. In a yet further aspect, the ink layer can define the top surface of the decorative portion. Optionally, the ink layer can also define the bottom surface of the decorative portion. In a further aspect, the ink layer can have a protective acrylic coating to aid in processing and adhesion. In an additional aspect, the decorative portion can be configured to overlie the backing portion. In this aspect, the decorative portion can be substantially adjacent to the backing portion such that the top surface of the backing portion contacts the bottom surface of the decorative portion. It is contemplated that the ink layer can be applied either directly or indirectly thereto the top surface of the backing portion of the floor covering. Alternatively, the decorative portion can be spaced from the backing portion.

In a further aspect, the ink layer can comprise any conventional ink, dye, pigment, or other marking substance that can be applied within the resilient floor covering in a desired pattern. For example and without limitation, the ink layer can comprise water-based, soy-based, and/or solvent-based pigments that are selected to operatively adhere to the underlying decorative layer. In an exemplary aspect, the ink layer can comprise inks and pigments manufactured by Sun Chemical Corporation.

In a further aspect, the ink layer can be applied to the underlying decorative layer by any conventional printing means, which can include, without limitation, rotogravure printing, flexography printing, lithography printing, offset-lithography printing, relief printing, thermography printing, thermal sublimation printing, dye-sublimation printing, heat-transfer printing, and the like.

In a further aspect, the decorative portion of the floor covering can comprise a decorative layer. In this aspect, the decorative layer can have any desired aesthetic appearance, such as, for example and without limitation, the appearance of simulated hardwood or ceramic flooring. In one aspect, the decorative layer can define the bottom surface of the decorative portion of the floor covering. In an additional aspect, the ink layer can be configured to substantially overlie the decorative layer. In this aspect, the decorative layer can be adjacent to the ink layer.

In a further aspect, the decorative layer can comprise a film. In still a further aspect, the decorative layer can comprise, for example and without limitation, oriented polypropylene (OPP), polypropylene (PP) film, filled PP film, for example and without limitation, Teslin) substrate (Commercially available from PPG Industries), polyethylene (PE) film, polyethylene terephthalate (PET) film, oriented polyethylene terephthalate (PET) film, polytrimethylene terephthalate (PTT) film, nylon film, woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, nylon 6, nylon 6,6, conventional papers, conventional foils, and the like. In a yet further aspect, the decorative layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), or a copolymer thereof. In an even further aspect, the decorative layer can have a thickness in the range of from about 1 mil to about 8 mil, including exemplary thicknesses of 2, 3, 4, 5, 6, or 7 mil.

In a further aspect, the decorative layer of the decorative portion can comprise a three-layer film, for example and without limitation, a SynDECOR@ OPP Film manufactured by Applied Extrusion Technologies, Inc. In this aspect, the three-layer film can comprise a top skin, a central core, and a bottom skin. In one aspect, the top skin can be configured to be compatible with the ink layer of the decorative portion of the floor covering. It is contemplated that at least a portion of the ink layer can be applied thereon the top skin of the three-layer film. In another aspect, the central core of the three-layer film can comprise a solid material. In this aspect, the solid material can be substantially opaque. In this aspect, an opaque film can be used. Such an exemplary opaque film is desirable because it can create a color barrier between the decorative layer and the subsequent backing layers that may vary in color. In a further aspect, the bottom skin of the three-layer film can be configured to be compatible with the post-industrial carpet and/or post-consumer carpet materials forming portions of the one or more primary backing layers.

Wear Layer

According to various aspects of the invention, the resilient floor covering comprises a wear layer. In a further aspect, the wear layer can have an exposed, outer surface and an opposed, bottom surface. In this aspect, the outer surface of the wear layer can be configured for exposure to the ambient environment. In another aspect, the wear layer can be configured to substantially overlie the decorative portion of the floor covering. It is contemplated that the wear layer can be adjacent to the decorative portion such that the top surface of the decorative portion contacts the bottom surface of the wear layer. Alternatively, the wear layer can be spaced from the decorative portion.

In one aspect, the wear layer can comprise, for example and without limitation, conventional ionomers, polyethylene terephthalate (PET), polyurethane, polypropylene, polytrimethylene terephthalate (PTT), nylon 6, nylon 6,6, and the like. In a further aspect, the wear layer can comprise surlyn resin, such as, for example and without limitation, Surlyn®) 1706 resin, manufactured by E.I. du Pont de Nemours and Company, Inc. In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof. In a yet further aspect, the wear layer can have a thickness in the range of from about 4 mil to about 30 mil, including exemplary thickness ranges of from about 4 to about 8 mil, about 9 to about 14 mil, or about 16 to about 30 mil. In a still further aspect, the thickness can be in a range derived from any of the above listed exemplary values. For example, the thickness can in the range of from about 4 mil to about 9 mil, or from 4 mil to about 16 mil. In another aspect, the wear layer can be embossed with a desired texture pattern.

In various aspects, the exposed outer surface portion of the wear layer can further comprise a scratch layer. In one aspect, the scratch layer comprises polyurethane, or acrylate, or a combination thereof. In a further aspect, the scratch layer can comprise a mixture of reactive monomers and oligomers. In a still further aspect, the scratch layer can comprise functionalized monomers, for example, and without limitation, difunctional and multifunctional monomers. In an even further aspect, the scratch layer can comprise at least one photoinitiator, or other component to catalyze a reaction among materials present in the scratch layer. In some aspects, the scratch layer comprises a blend of epoxy acrylate oligomers with difunctional and multifunctional monomers.

In a further aspect, the scratch layer comprises a surface hardening agent. In a still further aspect, the surface hardening agent can comprises aluminate, alumina, acrylic beads, silica, glass spheres, sol gel alumina, nylon Orgasol, MF silica Optbeads, polyethylene dispersion, silyl acrylic set wet particles, wollastonite, clay, silyl acrylic polysiloxane, sodium silicate, polyvinylidene difluoride (PVDF), silicon carbide, quartz, or a combination thereof. In some aspects, the surface hardening agent is alumina, silica, or a combination thereof.

In a further aspect, the scratch layer has a thickness in the range of from about 0.25 to about 3 mils, including exemplary ranges of from about 0.50 to about 1.25 mils, and 0.50 to about 2.25 mils. In a still further aspect, the surface hardening agent is present in an amount in the range of from about 0.25 weight % to about 15 weight % based upon the total weight of the scratch layer, including exemplary ranges of from about 2 weight % to about 3 weight %, and about 2 weight % to about 10 weight % based upon the total weight of the scratch layer. In some aspects, the surface hardening agent is present in an amount less than or equal to 10 weight %, for example, less than about 9, 8, 7, 6, 5, 4, 3, 2, or 1 weight % based upon the total weight of the scratch layer. In a further aspect, the surface hardening agent comprises particulate material having an average particle size less than or equal to 20 microns, for example, less than or equal to about 15, 10, 9, 8, 7, 6, 5, 4, 3, 2, or 1 micron. In some aspects, the scratch layer is adhered to an underlying wear layer portion by a primer coating layer. In a further aspect, the primer coating layer has a thickness in the range of from about 0.25 to about 1 mil, for example, from about 0.40 to about 0.6 mil.

Tie Layer

According to various further aspects of the invention, the resilient floor covering can optionally comprise at least one tie layer. In one aspect, the at least one tie layer can be positioned between opposing layers of the resilient floor covering to bond otherwise dissimilar materials that form the otherwise opposing layers of the floor covering together. As one skilled in the art will appreciate, such dissimilar materials can have inherent properties that negatively affect the ability of the respective materials to bond or otherwise adhere to each other.

In one aspect, one or more tie layers of the at least one tie layer can be positioned therebetween the bottom surface of the wear layer and the top surface of the decorative portion of the floor covering. In another aspect, a tie layer of the at least one tie layer can be positioned therebetween the bottom surface of the decorative portion and the top surface of the backing portion.

In a further aspect, each of the at least one tie layer can independently comprise, for example and without limitation, polyethyleneimine (PEI), conventional acrylic materials, maleic anhydride (MAH), ethylene-methyl acrylate (EMA), ethylene-vinyl acetate (EVA), and the like. In a still further aspect, each of the at least one tie layer can independently comprise ethylene-acrylic acid (EAA), ethylene-acrylic acid-maleic anhydride (EAA-MAH), ethylene-methyl acrylate-maleic anhydride (EMA-MAH), ethylene-vinyl acetate-maleic anhydride (EVA-MAH), low density polyethylene-maleic anhydride (LDPE-MAH), high density polyethylene-maleic anhydride (HDPE-MAH), polyurethane (PUR), polyurethane dispersion (PUD), or acrylic.

In a further aspect, at least one tie layer can comprise Entira™ modifiers and additives, such as, for example and without limitation, Entira™ Coat 100 modifier and additive manufactured by E.I. du Pont de Nemours and Company, Inc. In a still further aspect, the at least one tie layer can comprise water borne coating primers, including, for example and without limitation, G-680 Primer manufactured by Mica Corporation. In a yet further aspect, one or more of the opposing layers are pretreated with at least one of: corona, plasma, ion flame, alcohol, ozone, UV, or primer coating prior to positioning the one or more tie layer.

Balancing Layer

According to various further aspects of the invention, the resilient floor covering can optionally comprise at least one balancing layer. In one aspect, the at least one balancing layer can be positioned between opposing layers of the resilient floor covering to provide support, for example, to the backing portion. In another aspect, the at least one balancing layer can be positioned on bottom surface of the flooring product.

In a further aspect, the at least one balancing layer can comprise oriented polypropylene (OPP), woven polyethylene (PE), nonwoven polyethylene (PE), woven polypropylene (PP), nonwoven polypropylene (PP), woven polyethylene terephthalate (PET), nonwoven polyethylene terephthalate (PET), woven nylon, nonwoven nylon, nonwoven fiberglass, woven fiberglass, recycled fiber shoddy, or a combination thereof.

Figure 3:
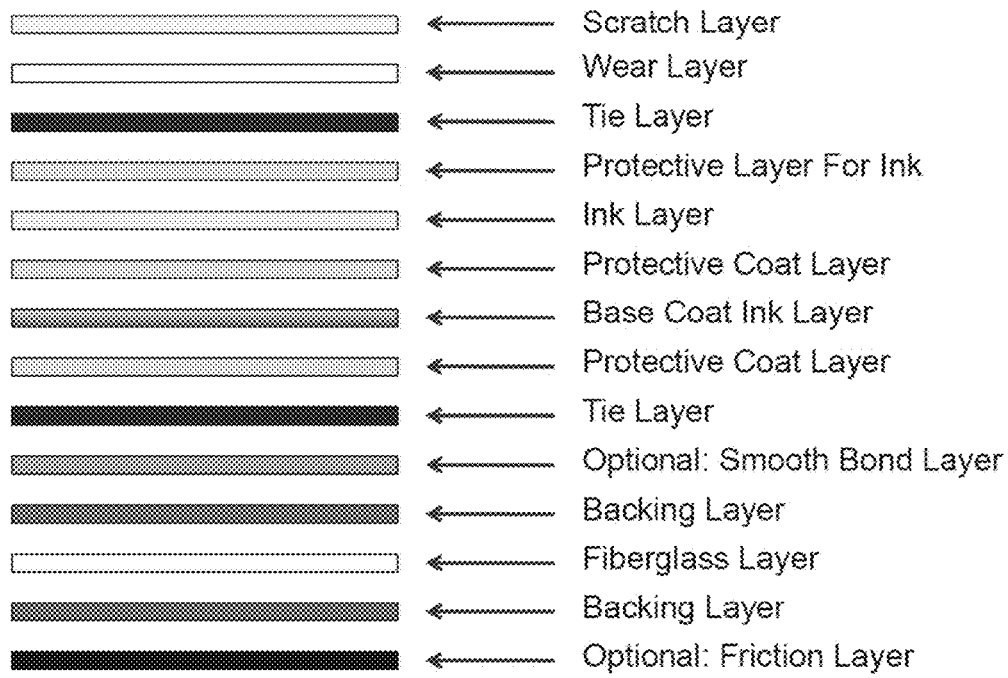
FIG. 3 depicts an exemplary structure of the non-vinyl resilient flooring product according to the present invention.

Referring now to the particular example illustrated in FIG. 3, an exemplary construction of the floor covering of the present invention is shown. In one aspect, the resilient floor covering comprises, from the top, a wear layer connected to either the top surface of the ink layer of the decorative portion or the top surface of the topmost tie layer, which for example, can comprise ethylene-acrylic acid-maleic anhydride (EAA-MAH). In a further aspect, a scratch layer forms the exposed outer portion of the wear layer, which for example, can comprise polyurethane and $Al_2O_3$. If needed, a protective layer for the ink layer can be present on the top surface of the ink layer and below the uppermost tie layer. Next, connected to bottom surface of the ink layer is the film/décor layer, which together form the decorative portion. In one aspect, the film/décor layer comprises two layers, a base coat ink layer, and a protective coat layer. In a further aspect, and as shown in the present embodiment, the protective coat layer can comprise one or more layers. In a still further aspect, the protective coat layer can, for example, comprise acrylic, the base coat ink layer can, for example, comprise PET foil or film, and ink layer can, for example, comprise Sun Ink with Hartmann Pigments. Next, a first backing layer, which for example, can comprise a 80% filled polypropylene composition, such as, for example, Vertex 80, is connected to the bottom surface of the film/décor layer using a second tie layer. Alternatively, an optional smooth bond layer, which can, for example comprise Affinity PE, can be connected to the bottom surface of the second tie layer and the top surface of first backing layer film/décor layer if desired or if the materials that form the adjacent layers require the use of a smooth bond layer. Next, a fiberglass layer, for example fiberglass mat, is connected to the bottom surface of the first backing layer, and to the top surface of a second backing layer, which together form the backing portion. Finally, if desired, a friction layer, for example, glue, or felt, can be connected to the bottom surface of the second backing layer.

Figure 4:
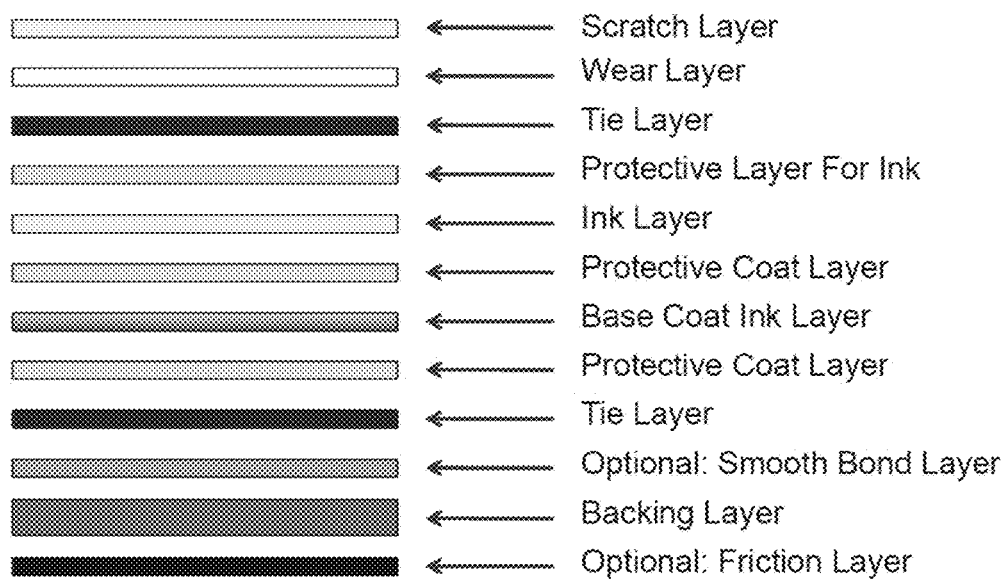
FIG. 4 depicts an exemplary structure of the non-vinyl resilient flooring product according to the present invention.

Referring now to the particular example illustrated in FIG. 4, another exemplary construction of the floor covering of the present invention is shown. In one aspect, resilient floor covering comprises, from the top, a wear layer connected to either the top surface of the ink layer of the decorative portion or the top surface of the topmost tie layer, which for example, can comprise ethylene-acrylic acid-maleic anhydride (EAA-MAH). In a further aspect, a scratch layer forms the exposed outer portion of the wear layer, which for example, can comprise polyurethane and $Al_2O_3$. If needed, a protective layer for the ink layer can be present on the top surface of the ink layer and below the uppermost tie layer. Next, connected to bottom surface of the ink layer is the film/décor layer, which together form the decorative portion. In one aspect, the film/décor layer comprises two layers, a base coat ink layer, and a protective primer coat layer. In a further aspect, and as shown in the present embodiment, the protective coat layer can comprise one or more layers. In a still further aspect, the protective coat layer can, for example, comprise acrylic, the base coat ink layer can, for example, comprise PET foil or film, and ink layer can, for example, comprise Sun Ink with Hartmann Pigments. Next, the backing layer of the backing portion, which for example, can comprise a 80% filled polypropylene composition, such as, for example, Vertex 80, with chopped fiberglass, is connected to the bottom surface of the film/décor layer using a second tie layer. Alternatively, an optional smooth bond layer, which can, for example comprise Affinity PE, can be connected to the bottom surface of the second tie layer and the top surface of first backing layer film/décor layer if desired or if the materials that form the adjacent layers require the use of a smooth bond layer. Finally, if desired, a friction layer, for example glue or felt, can be connected to the bottom surface of the backing layer.

Properties of Resilient Floor Coverings

According to various aspects of the disclosure, the resilient floor coverings of the present invention exhibit improved physical and mechanical properties.

In one aspect, the wear layer exhibits an abrasion resistance greater than 5000 cycles when measured according to ASTM D3884 under testing conditions comprising an H18 wheel, 1000 gram load, and clean each 300 cycles, including exemplary abrasion resistances of greater than 5000 cycles, greater than 10,000 cycles, or greater than 20,000 cycles when measured according to ASTM D3884 under testing conditions comprising an H18 wheel, 1000 gram load, and clean each 300 cycles.

In one aspect, the scratch layer in combination with the wear layer exhibits an abrasion resistance greater than 5000 cycles when measured according to ASTM D3884 under testing conditions comprising an H18 wheel, 1000 gram load, and clean each 300 cycles, including exemplary abrasion resistances of greater than 5000 cycles, greater than 10,000 cycles, or greater than 20,000 cycles when measured according to ASTM D3884 under testing conditions comprising an H18 wheel, 1000 gram load, and clean each 300 cycles.

In one aspect, the scratch layer exhibits an abrasion resistance in the range of from about 100 cycles to about 500 cycles when measured according to ASTM D3884 under testing conditions comprising an H18 wheel, 1000 gram load, and clean each 300 cycles, including exemplary abrasion resistances ranges of from about 100 cycles to about 400 cycles, or from about 200 cycles to about 300 cycles when measured according to ASTM D3884 under testing conditions comprising an H18 wheel, 1000 gram load, and clean each 300 cycles.

In one aspect, the exposed outer surface of the wear layer exhibits a micro-scratch resistance characterized by of a gloss change rating in the range of 1 to 3 when measured pursuant to Martindale Test EN 16094-2012 Test A (MSR-A) or Test B (MSR-B) visual assessment of surface scratching.

In one aspect, the scratch layer exhibits a heat stability of less than about 12 average Delta E's as determined by ASTM F1514 or ASTM F1515, for example, less than about 8 average Delta E's as determined by ASTM F1514 or ASTM F1515.

In one aspect, the scratch layer exhibits a coating adhesion value in the range of from 4B to 5B as measured according to ASTM-D3359-02 Type B. In a further aspect, the scratch layer exhibits a gloss level in the range of from 5 to 50 as measured with a BYK Gardner Micro-Gloss 60 degree instrument. In a still further aspect, the scratch layer exhibits a gloss level in the range of from 6 to 30 as measured with a BYK Gardner Micro-Gloss 60 degree instrument.

In a further aspect, the scratch layer exhibits a micro-scratch resistance characterized by a gloss change rating in the range of 1 to 3 when measured pursuant to Martindale Test EN 16094-2012 Test A (MSR-A). In a still further aspect, the scratch layer exhibits a micro-scratch resistance characterized by of a gloss change rating in the range of 1 to 3 when measured pursuant to Martindale Test EN 16094-2012 Test B (MSR-B).

In one aspect, the disclosed resilient floor coverings exhibit a static load limit indentation depth in the range of from about 0 inches to about 0.09 inches as measured pursuant to ASTM F970 under conditions of: 250 lb. static load for 24 hours, recover of 24 hours, and 1.125 inch outside diameter probe, including exemplary static load limit indentation depth ranges of from about 0 inches to about 0.07 inches, or from about 0 inches to about 0.05 inches as measured pursuant to ASTM F970 under conditions of: 250 lb. static load for 24 hours, recover of 24 hours, and 1.125 inch outside diameter probe.

In one aspect, the disclosed resilient floor coverings exhibit a short term residual indentation depth in the range of from 0 inches to 0.09 inches as measured pursuant to ASTM F1914 under conditions of: 140 lb. load for 10 minutes, recover of 60 minutes, including exemplary short term residual indentation depth ranges of from about 0 inches to about 0.07 inches, or from about 0 inches to about 0.05 inches as measured pursuant to ASTM F1914 under conditions of: 140 lb. load for 10 minutes, recover of 60 minutes.

In one aspect, the disclosed resilient floor coverings exhibit a critical radiant flux of a class 2 flame spread as measured pursuant to ASTM-E648. In a further aspect, the disclosed resilient floor coverings can exhibit a critical radiant flux of a class 1 flame spread as measured pursuant to ASTM-E648.

In one aspect, the disclosed resilient floor coverings exhibit a dimensional stability of less than about 0.17% as determined by ASTM F2199-0 at 82° C. and 24 hr, including dimensional stability values of less than about 0.15% or less than about 0.10% as determined by ASTM F2199-0 at 82° C. and 24 hr. In a further aspect, the disclosed resilient floor coverings can exhibit a dimensional stability characterized by an amount of doming or curling in the range of from 0 to no more than 3/32" of an inch when subjected to test conditions of ASTM F2199-0 at 82° C. and after 24 hr. In a still further aspect, the dimensional stability is characterized by an amount of doming or curling of less than about 3/32" of an inch when subjected to test conditions of ASTM F2199-0 at 82° C. and after 24 hr, for example, less than about 1/16" of an inch when subjected to test conditions of ASTM F2199-0 at 82° C. and after 24 hr.

Methods of Making

In various aspects, methods of making the resilient floor coverings are also disclosed. In one aspect, a method of making the resilient floor coverings described herein can comprise providing the backing portion as described herein.

Optionally, in another aspect, the method of making the resilient floor coverings described herein can comprise applying the decorative portion thereto the top surface of the backing portion. In a further aspect, the method of making the resilient floor coverings described herein can comprise applying a tie layer as described herein thereto the top surface of the backing portion. In this aspect, the method of making the resilient floor coverings described herein can comprise applying the decorative portion thereto the tie layer applied to the backing portion. It is contemplated that the bottom surface of the decorative portion can be substantially directly applied to the top surface of the backing portion or the tie layer applied thereto the backing portion. It is also contemplated that the bottom surface of the decorative portion can be applied to the top surface of the backing portion, or the tie layer applied thereto the backing portion, using a chemical adhesive, mechanical connection, or other application means.

Optionally, in an additional aspect, the method of making the resilient floor coverings described herein can comprise applying the wear layer thereto the top surface of the decorative portion. In an alternative aspect, the method of making the resilient floor coverings described herein can comprise applying one or more tie layers as described herein thereto the top surface of the decorative portion. In this aspect, the method of making the resilient floor coverings described herein can comprise applying the wear layer thereto the tie layer applied to the decorative portion. It is contemplated that the wear layer can be substantially directly applied to the top surface of the decorative portion or the tie layer applied thereto the decorative portion. It is also contemplated that the wear layer can be applied to the top surface of the decorative portion, or the tie layer applied thereto the decorative portion, using a chemical adhesive, mechanical connection, or other application means. In a further aspect, the wear layer, having an exposed outer surface portion, is applied thereto a top surface of the decorative portion, and the exposed outer surface portion of the wear layer further comprises a scratch layer.

In various aspects, the chemical adhesive can comprise any desired adhesive. In a further aspect, the chemical adhesive can comprise at least one of: ethylene-acrylic acid-maleic anhydride (EAA-MAH), ethylene-methyl acrylate-maleic anhydride (EMA-MAH), ethylene-vinyl acetate (EVA), ethylene-acrylic acid-maleic anhydride (EAA-MAH), ethylene-methyl acrylate (EMA), ethylene-vinyl acetate (EVA), polyurethane (PUR), polyurethane dispersion (PUD), or acrylic adhesive. In a still further aspect, the adhesive can comprise a film or powder. In a yet further aspect, the adhesive is heat activated, UV cured, or eBeam cured. In some aspects, the adhesive is EAA-MAH.

In various aspects, the disclosed layers of the resilient floors covering can be constructed or otherwise formed by conventional methods and/or processes. Similarly, it is contemplated that the respective layers can be connected to each other in sequential or non-sequential order. Unless otherwise stated, no particular order of operative steps for product formation is required to practice the present invention. It is further contemplated that any conventional means of forming or joining layers of a layered construct such as the exemplified resilient floor covering can be used, to include, without limitation, extrusion, lamination, combinations of the same, and the like. Finally, it is contemplated that after the layers of the flooring covering are joined together, the resulting sheet of flooring composite can be cut into desired shapes and desired sizes, for example, and without limitation, into plank or tile shapes that can be conventionally or non-conventionally sized and/or shaped.

As disclosed herein, in one aspect, the materials that are selected for the respective layers of the flooring covering can be readily recycled. It is contemplated that one or more of the respective layers of the can comprise recycled post-consumer and/or post-industrial materials, such as, for example and without limitation, recycled post-industrial carpet and/or post-consumer carpet polymeric materials. In this aspect, the formed floor covering can minimize use of virgin materials and advantageously allow for the use of previously recycled materials in forming the recyclable flooring covering of the present invention.

In one aspect, an exemplary method of constructing the resilient floor covering can initially comprise the step of adhering one or more layers of ink onto the top surface of the film/décor layer using conventional print means. Next, a tie layer can subsequently be applied to the top surface of the ink layers if desired or if the materials that form the respective ink layers and wear layer require the use of a tie layer. Optionally, the tie layer can be extruded onto or laminated thereto the top surface of the ink layer. In some aspects, the film/décor layer comprises the three layer AET SynDECOR® OPP film and the ink layer comprises Sun Ink with Hartmann Pigments. For this example, two successive tie layers are applied, Mica G680, which is connected to the top surface of the ink layer, and Entira™ Coat 100, which is applied to the top surface of the Mica G680 tie layer.

In a further aspect, a first backing layer is extruded thereon or otherwise connected to the bottom surface of the film/décor layer and a fiberglass mat layer is imbedded therein the bottom surface of the first backing layer. Of course, prior to this step, an optionally tie layer can be connected to the bottom surface of the film/décor layer if required.

In a further aspect, a wear layer is extruded or otherwise connected to either the top surface of the ink layer or the top surface of the topmost tie layer. It is contemplated that, if needed, the application of the tie layer to the top surface of the ink layer and the application of the wear layer to the uppermost tie layer can be done sequentially in a co-extrusion process. For example, in some aspects, an Entira™ Coat 100 tie layer and a Surlyn® 1706 wear layer can be sequentially applied to the top surface of the underlying Mica G680 tie layer.

In a further aspect, a second backing layer can be extruded thereon or otherwise connected to the bottom surface of the fiberglass mat layer to fully encapsulate the fiberglass layer. Referring to FIG. 2, in one example, the respective first backing layer and second backing layer can comprise the backing composition described herein. Next, if desired, a secondary backing, such as the exemplified non-woven polypropylene secondary backing, can be extruded thereon or otherwise connected to the bottom surface of the second backing layer.

Of course, as noted in FIG. 2, an optional tie layer could be applied to the bottom surface of the film/décor layer if desired or if the materials forming the film/décor layer and the first backing layer were otherwise incapable of operatively bonding to each other. In some aspects, a tie layer may not be required to effect a desired bond, for example, between the three layer AET SynDECOR® OPP film (the film/décor layer) and the first backing layer. In various aspects, and as shown in FIGS. 3 and 4, a scratch layer can form the exposed outer portion of the wear layer.

In one aspect, initially the ink layer is applied to the top surface of the decorative layer. Sequentially, the first backing layer is applied to the bottom surface of the decorative layer, and the fiberglass material layer is applied to the bottom surface of the first backing layer. Next, sequentially, the tie layer is applied to the ink layer and the wear layer is applied to the top surface of the tie layer. Finally, sequentially, the second backing layer is applied to the fiberglass material layer thus adhering the secondary backing layer to the bottom surface of the fiberglass material layer.

In a further aspect, each layer or portion of the resilient flooring can be manufactured or laminated together using traditional manufacturing methods, such as, but not limited to, a static press. As would be recognized by one of skill in the art, the method used for lamination in a static press would include the use of heat and pressure between metal plates for a specified amount of time to press together each of the desired layers described herein. For example, and without limitation, a combination of the wear layer, tie layer(s), ink, film/decor layer, tie layer(s), and one or more backing layers, would be stacked in the desired order and placed inside the static press, then laminated together with the aforementioned combination of heat and pressure. In a still further aspect, one or more of the metal plates used to press the layers or portions of the resilient flooring together may include an emboss texture to transfer to the top or bottom surface of the resilient flooring. In a yet further aspect, this emboss texture could include a design desired for the wear layer that is inherent in the final product.

In a further aspect, the tie layer can be added onto the film/decor layer and/or the wear layer by extrusion coating prior to lamination. As would be recognized by one of skill in the art, a typical sheet extrusion process, whereby the tie layer is melted and cast through a sheet die, is used to apply a desired amount of the material onto the film. After coating the film with the extrusion process, the material is quenched or set with a typical cooling process, such as cooling rolls, prior to the coated film being re-rolled. In a still further aspect, the tie layer may be in the form of a liquid hot melt or cold melt adhesive, and can be added onto the film/decor layer and/or the wear layer by a spray or roll-coating process. In a yet further aspect, and as would be recognized by one of skill in the art, the tie layer is applied to the film while in liquid form by spray equipment or roll-coating equipment, and then dried with heat, air, or other curing means prior to re-rolling the film.

Figure 5:
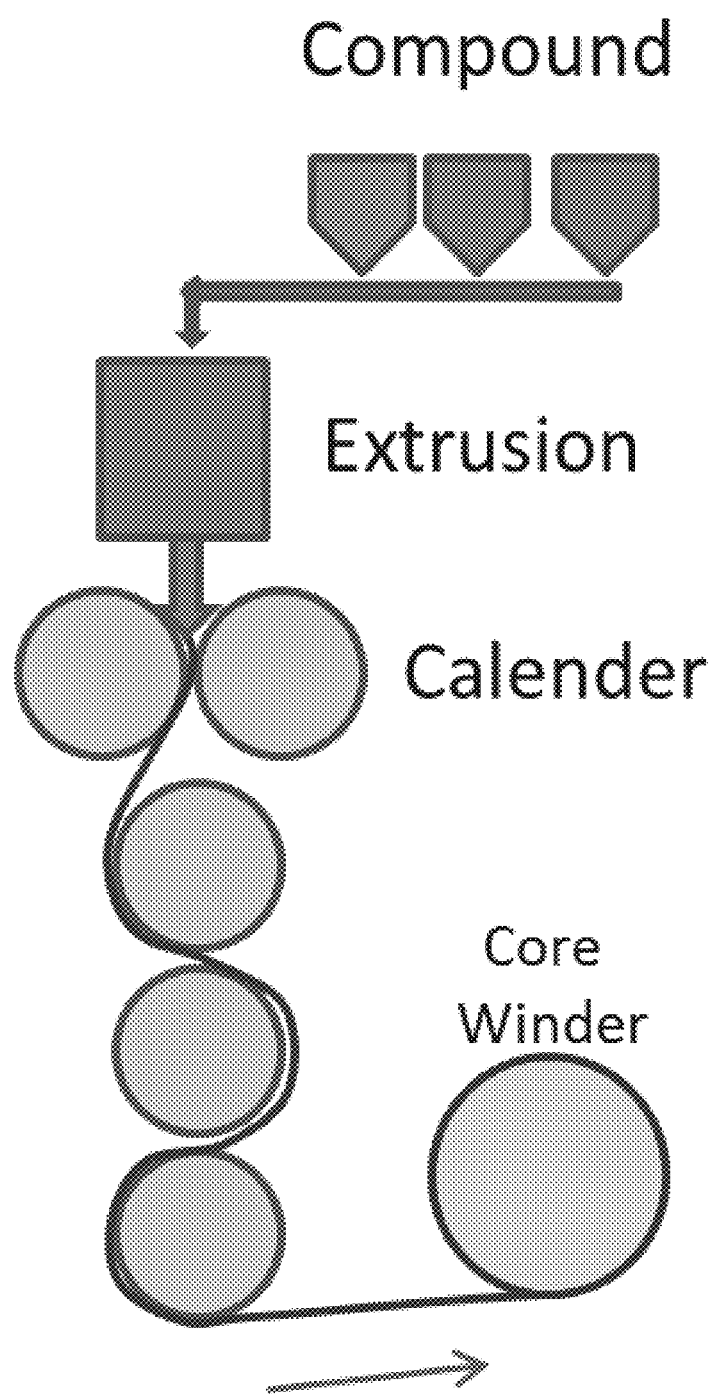
FIG. 5 depicts an exemplary manufacturing methodology for producing the non-vinyl resilient flooring products of the present invention.

In some aspects, each individual layer or portion of the resilient floor covering can be independently manufactured prior to the production of the resilient floor covering. For example, and referring now to the particular example illustrated in FIG. 5, an exemplary system for producing backing layer is shown. Here, the backing composition, which optionally can include a tacifier, recycled content, and/or chopped fiberglass is compounded, extruded, and rolled through a calendar to form backing layer. The formed backing layer is then wound by the core winder into rolls, which can later be used to produce the disclosed resilient floor coverings.

Figure 6:
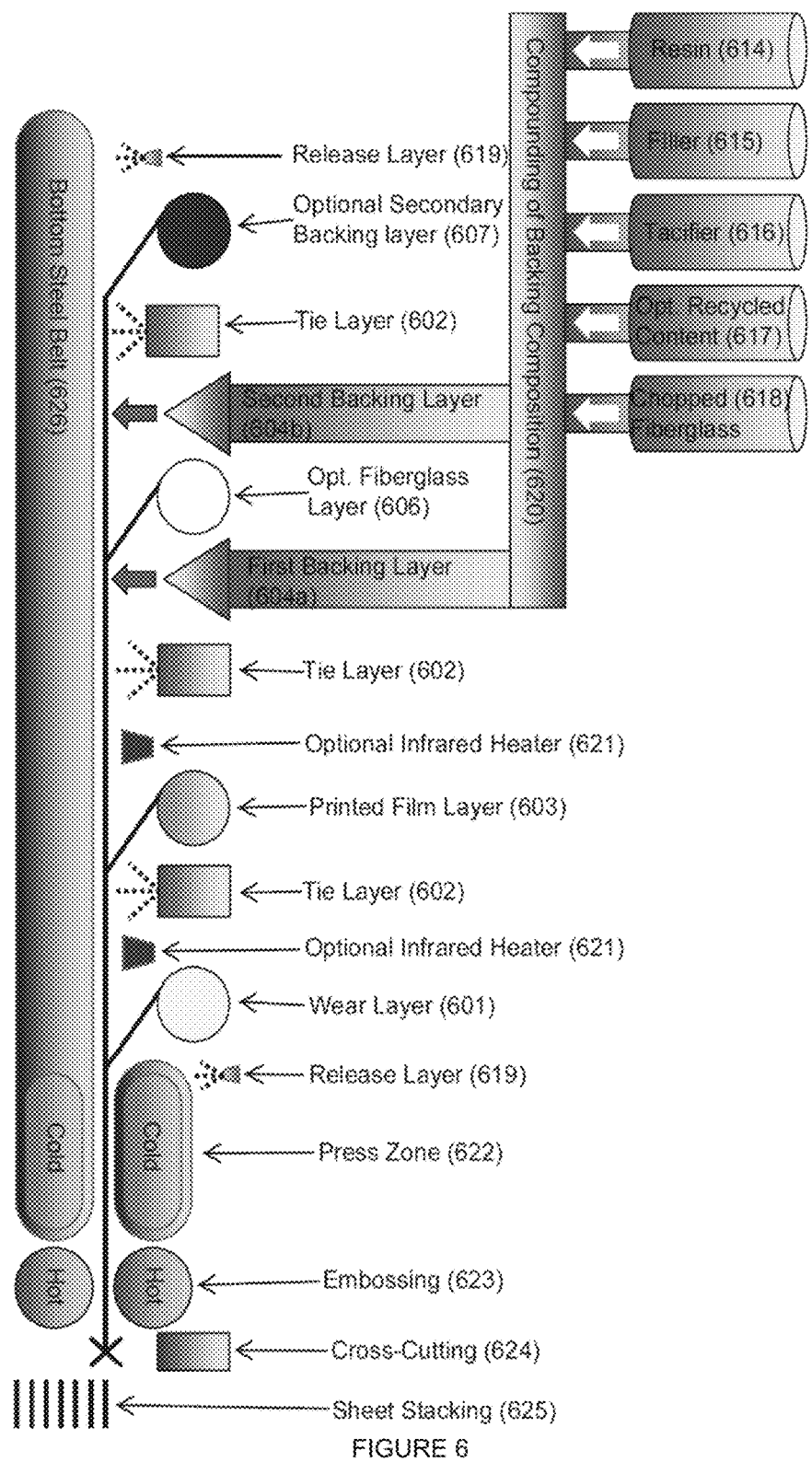
FIG. 6 depicts an exemplary manufacturing methodology for producing the non-vinyl resilient flooring products of the present invention.

In other aspects, each layer or portion of the resilient floor covering can each be manufactured inline with the production of the resilient floor covering. For example, and referring now to the particular example illustrated in FIG. 6, an exemplary system for producing resilient floor covering is shown using backing composition inline compounding and molten extrusion. In a further aspect, a release layer 619, for example a release spray or film, direct contact felt applicator, or optionally, a release paper, is dispersed onto a top surface of a cooled moving bottom belt 626. Next, optionally, a secondary backing layer 607 is unrolled onto the release layer 619, next sequentially if the secondary backing layer 607 is used, a tie layer 602 is extruded onto a top surface of the secondary backing layer 607. Sequentially, the backing composition 620, comprising resin binder 614 and filler 615, which optionally can include a tacifier 616, recycled content 617, and/or chopped fiberglass 618, is inline compounded and is applied thereon the tie layer 602. In the embodiment in which the backing layer of the backing portion comprises a first backing layer 604a and a second backing layer 604b, a fiberglass mat layer 606 can be rolled thereon the first backing layer 604a and, sequentially, the backing composition 620 is inline compounded and is applied thereon the fiberglass mat layer 606. In this embodiment, the second backing layer 604b defines the bottom surface of the backing portion and the first backing layer 604a defines the top surface of the backing portion. Here, if a secondary backing layer 607 is used, it is contemplated that the first backing layer 604a and second backing layer 604b are configured to substantially overlie the secondary backing layer 607.

In a further aspect, a tie layer 602 can be subsequently disposed on the top surface of the exposed backing composition forming the backing portion and it can be optionally operatively laminated using an infrared heater 621. In a still further aspect, a printed film layer 603, for example, polyethylene terephthalate (PET) or oriented polypropylene (OPP) is disposed thereon the tie layer 602 and an additional tie layer 602 is applied thereon to the top surface of the printed film layer 603, which again can be optionally operatively laminated using an infrared heater 621. In a next step, a wear layer 601, for example, amorphous polyethylene terephthalate (aPET), or Surlyn, or OPP, is applied and, sequentially, the release layer 619 is released prior to the flooring product passing through a press zone 622, for example, an isobaric press quench zone formed by the cooled moving bottom belt and an opposing cooled moving upper belt. Next, optionally, the flooring product is passed therebetween a pair of opposed heated rollers to emboss 623 the flooring product as desired prior to the flooring product being cut 624 to a desired size and/or shape, and stacked 625.

In another aspect, and referring now to the particular example illustrated in FIG. 7, an exemplary system for producing the floor covering is shown. In a further aspect, a release layer 719, for example, a release spray or film, or direct contact felt, or, optionally, a release paper, is dispersed onto a top surface of a heated and cooled moving bottom belt 726. Next, optionally, a secondary backing layer 707 is unrolled onto the release layer 719, next sequentially if the secondary backing layer 707 is used, a tie layer 702 is extruded onto a top surface of the secondary backing layer 707. Sequentially, the backing composition 720, comprising resin binder 714 and filler 715, which optionally can include a tacifier 716, recycled content 717, and/or chopped fiberglass 718, is inline compounded and is applied thereon the tie layer 702. In embodiments in which the backing layer of the backing portion comprises a first backing layer 704a and a second backing layer 704b, a fiberglass mat layer 706 can be rolled thereon the first backing layer 704a and, sequentially, the backing composition 720 is inline compounded and is applied thereon the fiberglass mat layer 706. In this embodiment, the second backing layer 704b defines the bottom surface of the backing portion and the first backing layer 704a defines the top surface of the backing portion. Here, if a secondary backing layer 707 is used, it is contemplated that the first backing layer 704a and second backing layer 704b are configured to substantially overlie the secondary backing layer 707.

In a further aspect, a tie layer 702 can then be disposed on the top surface of the exposed backing composition forming the backing portion and it can be optionally operatively dried using an infrared heater 721. A printed film layer 703, for example, polyethylene terephthalate (PET) or oriented polypropylene (OPP) is disposed thereon the tie layer 702 and an additional tie layer 702 is applied thereon to the top surface of the printed film layer 703, which again can be optionally operatively laminated using an infrared heater 721. In a next step, a wear layer 701, for example, amorphous polyethylene terephthalate (aPET), or Surlyn, or OPP, is applied and, sequentially, the release layer 719 is released prior to the flooring product passing through a press zone 722, for example, an isobaric press quench zone formed by the heated and cooled moving bottom belt and an opposing heated and cooled moving upper belt. In this aspect, it is contemplated that the isobaric quench zone sequentially heats then cools the flooring product as it is passes therethrough the quench zone. Next, optionally, the flooring product is passed therebetween a pair of opposed heated rollers to emboss 723 the flooring product as desired prior to the flooring product being cut 724 to a desired size and/or shape, and stacked 725.

Figure 8:
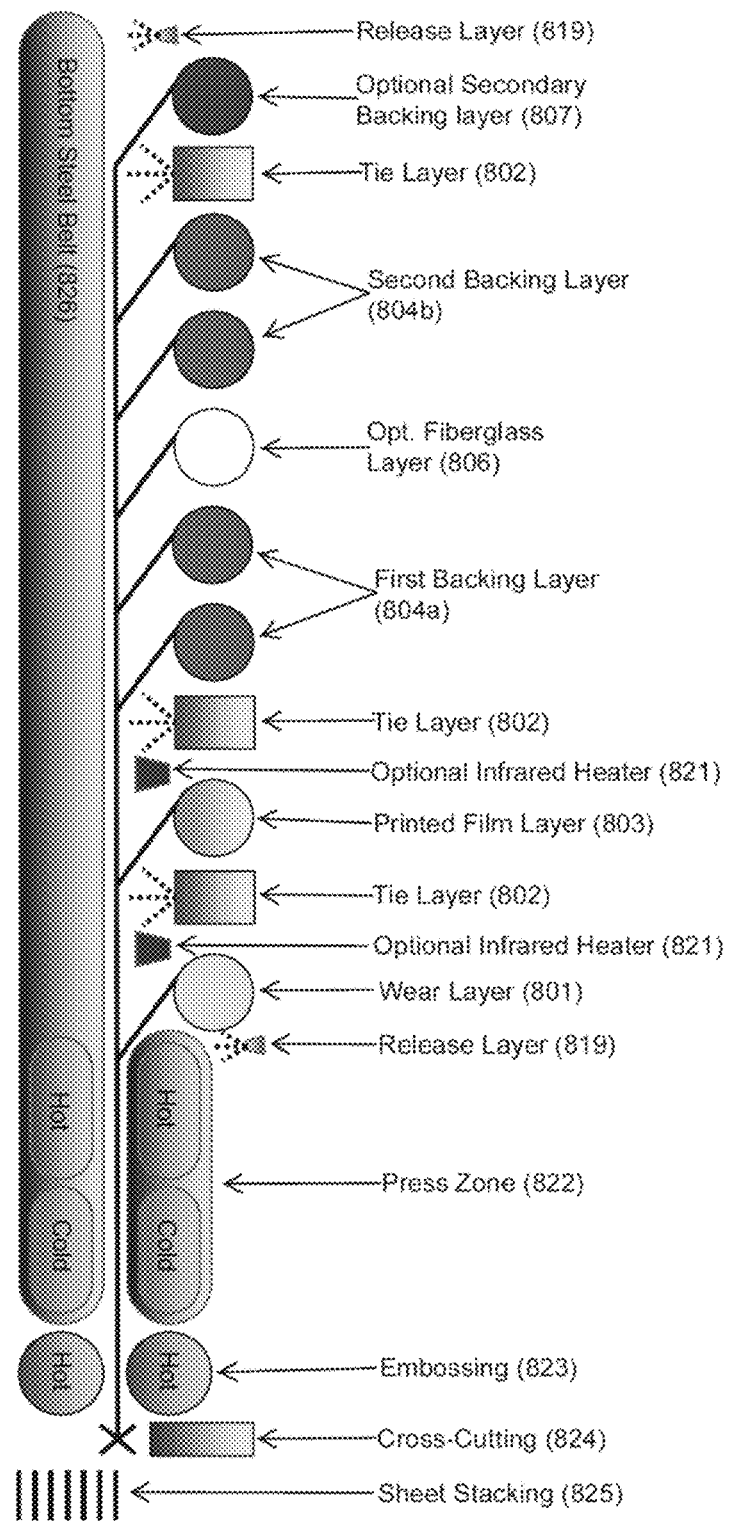
FIG. 8 depicts an exemplary manufacturing methodology for producing the non-vinyl resilient flooring products of the present invention.

In another aspect, and referring now to the particular example illustrated in FIG. 8, an exemplary system for producing the floor covering is shown. In a further aspect, a release layer 819, for example, a release spray or film, or direct contact felt, or, optionally, a release paper, is dispersed onto a top surface of a moving bottom belt 826. Next, optionally, a secondary backing layer 807 is unrolled onto the release layer 819, next sequentially if the secondary backing layer 807 is used, a tie layer 802 is extruded onto a top surface of the secondary backing layer 807. Sequentially, the backing composition is applied thereon the lie layer. As shown, it is contemplated that the backing composition can be formed in a film state that can be sequentially applied as layers to form a first backing layer 804a. In a further aspect, a fiberglass mat layer 806 can be sequentially rolled thereon the first backing layer 804a and, sequentially, the backing composition, in the form of film layers, can be sequentially applied thereon the fiberglass mat layer 806. In this embodiment, the second backing layer 804b of the at least one backing layer defines the bottom surface of the backing portion and the first backing layer 804a of the at least one backing layer defines the top surface of the backing portion. Here, if a secondary backing layer 807 is used, it is contemplated that the first backing layer 804a and second backing layer 804b are configured to substantially overlie the secondary backing layer 807.

Subsequently, a tie layer 802 can then be disposed on the top surface of the exposed backing composition forming the backing portion and it can be optionally operatively dried using an infrared heater 821. A printed film layer 803, for example, polyethylene terephthalate (PET) or oriented polypropylene (OPP) is disposed thereon the tie layer 802 and an additional tie layer 802 is applied thereon to the top surface of the printed film layer 803, which again can be optionally operatively laminated using an infrared heater 821. In a next step, a wear layer 801, for example, amorphous polyethylene terephthalate (aPET), or Surlyn, or OPP, is applied and, sequentially, the release layer 819 is released prior to the flooring product passing through a press zone 822, for example, an isobaric press quench zone formed by the heated and cooled moving bottom belt and an opposing heated and cooled moving upper belt. In this aspect, it is contemplated that the isobaric quench zone sequentially heats then cools the flooring product as it is passes therethrough the quench zone. Next, optionally, the flooring product is passed therebetween a pair of opposed heated rollers to emboss 823 the flooring product as desired prior to the flooring product being cut 824 to a desired size and/or shape, and stacked 825.

Figure 9:
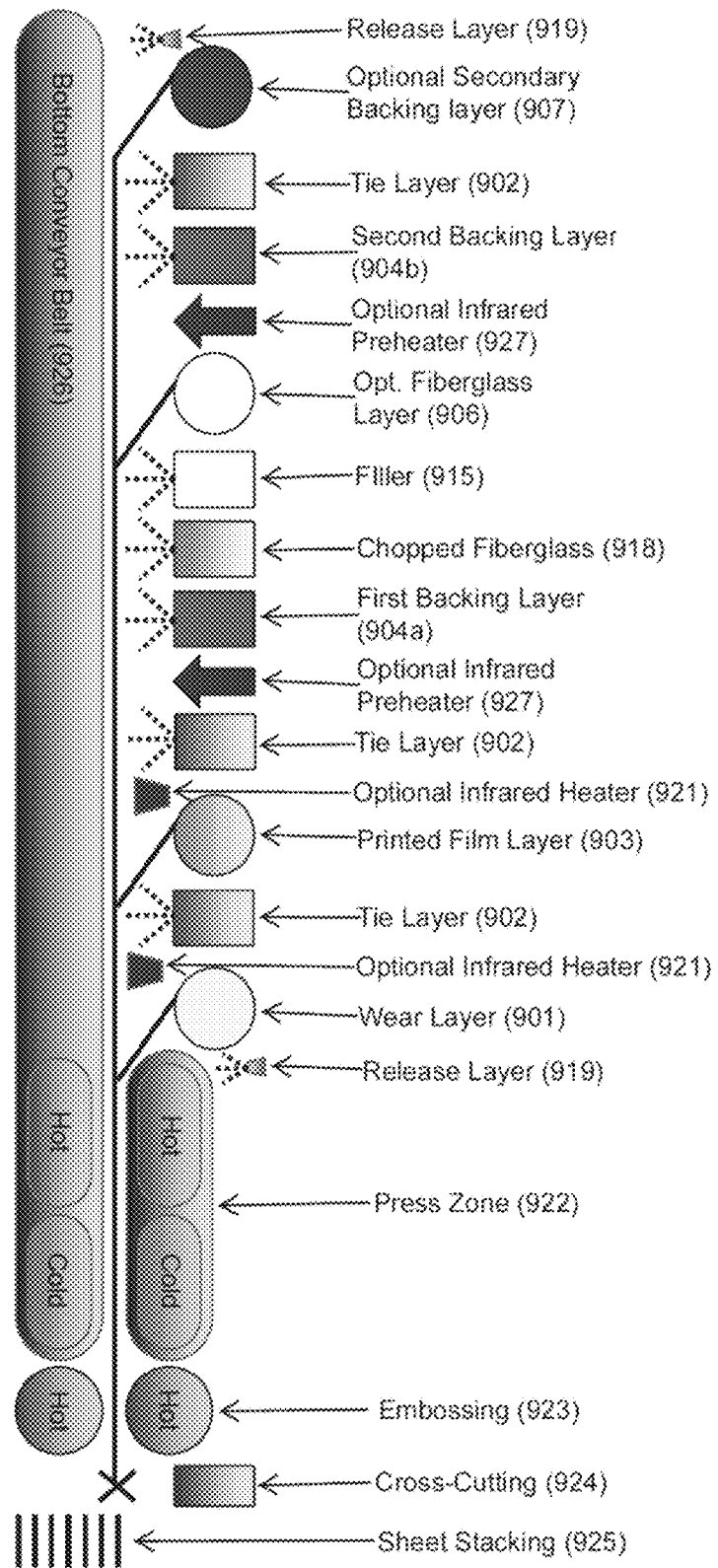
FIG. 9 depicts an exemplary manufacturing methodology for producing the non-vinyl resilient flooring products of the present invention.

In another aspect, and referring now to the particular example illustrated in FIG. 9, an exemplary system for producing the floor covering is shown. In a further aspect, a release layer 919, for example, a release spray or film, or direct contact felt, or, optionally, a release paper, is dispersed onto a top surface of a heated and cooled moving bottom belt 926. Next, optionally, a secondary backing layer 907 is unrolled onto the release layer 919, next sequentially if the secondary backing layer 907 is used, a tie layer 902 is extruded onto a top surface of the secondary backing layer 907. Sequentially, the backing composition, which is pelletized, is applied thereon the tie layer 902 and is optionally preheated with, for example and without limitation, a conventional infrared preheater 927 or the like. In an embodiment in which the backing layer of the backing portion comprises a first backing layer 904a and a second backing layer 904b, a fiberglass mat layer 906, or optionally chopped fiberglass 918, and/or filler 915, can be applied thereon the first backing layer 904a and, sequentially, the backing composition, which is pelletized, is applied thereon the fiberglass mat layer 906 and is optionally preheated with, for example and without limitation, a conventional infrared preheater 927 or the like. In this embodiment, the second backing layer 904b of the at least one backing layer defines the bottom surface of the backing portion and the first backing layer 904a of the at least one backing layer defines the top surface of the backing portion. Here, if a secondary backing layer 907 is used, it is contemplated that the first backing layer 904a and second backing layer 904b are configured to substantially overlie the secondary backing layer 907.

Next, a tie layer 902 can be disposed on the top surface of the exposed backing composition forming the backing portion and it can be optionally operatively dried using an infrared heater 921. In a further aspect, a printed film layer 903, for example, polyethylene terephthalate (PET) or OPP, is disposed thereon the tie layer 902 and an additional tie layer 902 is applied thereon to the top surface of the printed film layer 903, which again, can be optionally operatively dried using an infrared heater 921. In a next step, a wear layer 901, for example, amorphous polyethylene terephthalate (aPET), or Surlyn, or OPP, is applied and, sequentially, the release layer 919 is released prior to the flooring product passing through a press zone 922, for example, an isobaric press quench zone formed by the heated and cooled moving bottom belt and an opposing heated and cooled moving upper belt. In this aspect, it is contemplated that the isobaric quench zone sequentially heats then cools the flooring product as it is passes therethrough the quench zone. Next, optionally, the flooring product is passed therebetween a pair of opposed heated rollers to emboss 923 the flooring product as desired prior to the flooring product being cut 924 to a desired size and/or shape, and stacked 925.

Figure 10:
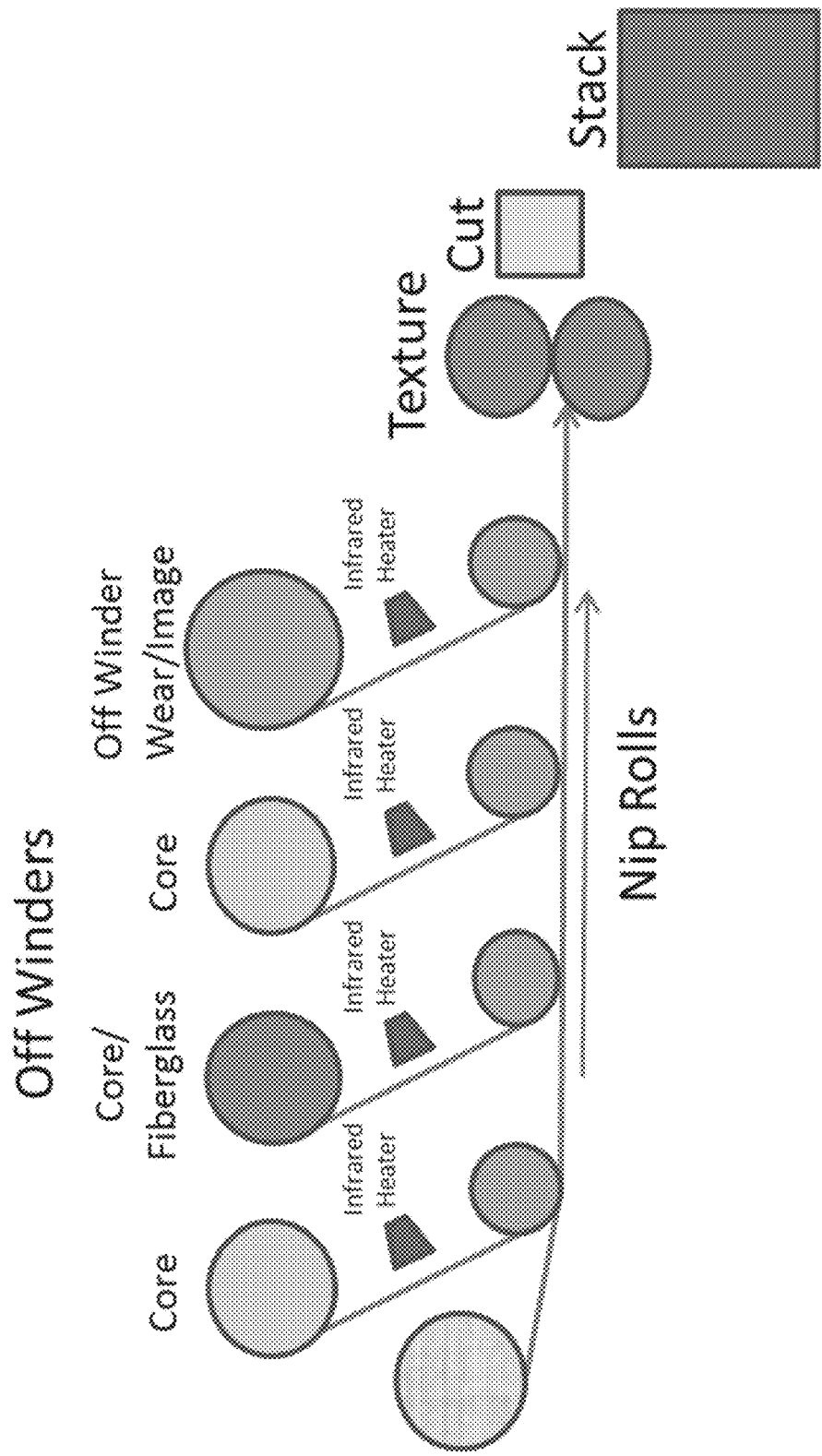
FIG. 10 depicts an exemplary manufacturing methodology for producing the non-vinyl resilient flooring products of the present invention.

In another aspect, and referring now to the particular example illustrated in FIG. 10, an exemplary system for producing the floor covering is shown. In a further aspect, the resilient floor covering can be prepared by a nip roll methods, for example, by applying the layers off rolls using winders. The formed backing layer is rolled onto a top surface of a nip roll. Optionally, a secondary backing layer can first be unrolled onto the belt, next sequentially if the secondary backing layer is used. In the embodiments in which the backing layer of the backing portion comprises a first backing layer and a second backing layer, a fiberglass mat layer can be rolled thereon the first backing layer and, sequentially, the second backing layer is rolled thereon the fiberglass mat layer. In this embodiment, the secondary backing layer defines the bottom surface of the backing portion and the first backing layer defines the top surface of the backing portion. Here, if a secondary backing layer is used, it is contemplated that the first and second backing layers are configured to substantially overlie the secondary backing layer.

In a next step, a wear/image layer is rolled thereon applied and the flooring product is the flooring product is optionally passed therebetween a pair of opposed rollers to emboss the flooring product as desired prior to the flooring product being cut to a desired size and/or shape, and stacked. In a further aspect, each rolled layer can be optionally operatively heated using an infrared heater or dryer.

Figure 11:
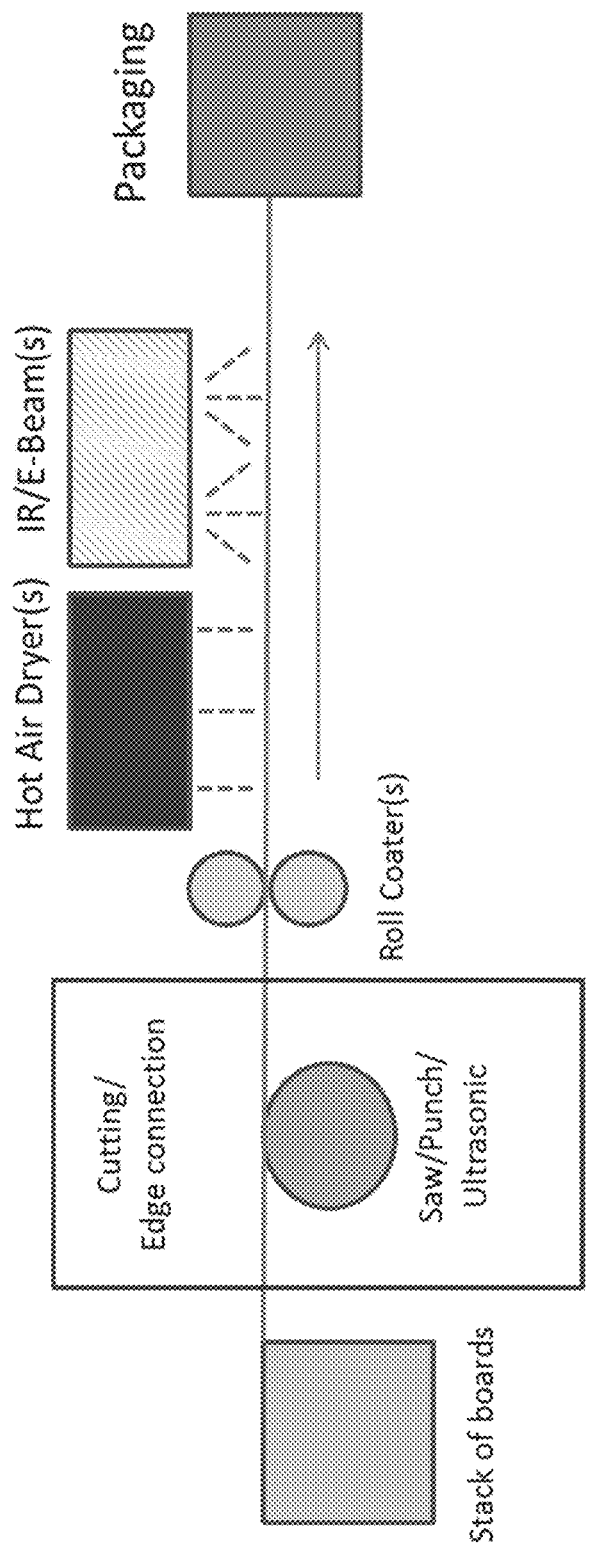
FIG. 11 depicts an exemplary manufacturing methodology for producing the non-vinyl resilient flooring products of the present invention.

In one aspect, the resilient floor covering can either be installed using glue to adhere to a sub floor or free-floating with an edge connection. In a further aspect, and referring now to the particular example illustrated in FIG. 11, the resilient floor product is subjected to an edge cutting or profiling step, for example and without limitation, to form an edge connection by saw, punch or, ultrasonic. In a next step, a scratch layer is applied by roll coater, and the flooring product is then passed through a hot air dryer zone and an infrared or e-Beam zone prior to packaging.

In a further aspect, the edge profile can have any desired edge profile design, for example and without limitation, a click-lock or tongue and groove connection system. In some aspects, the edge profile for connecting can have a more complex geometry. In a further aspect, the edge connection system can substantially restrict movement from side-to-side and vertically. In a still further aspect, the connection seams, once installed, are all uniform and flat at each connection point. In a yet further aspect, the edge profile can be different for all four edges.

In a further aspect, the edge profile can be formed by any desired means, for example, by milling, routing or tenoner process, or the like. In a still further aspect, the construction of the non-vinyl product must be engineered to allow the milling, routing or tenoner process to introduce the proper edge profile design.

As one of skill in the art will recognize, the backing composition formulation can, in various aspects, influence the stability of the backing portion, for example, the relative amounts and types of filler and polyolefin elastomer used in the formulation. In a further aspect, additives, such as tackifiers, foaming agents, process aids, and plasticizers can also influence the stability of the formulation. In a still further aspect, an unstable backing portion can have weak edge connection profiles that can be easily damaged. In a yet further aspect, smoothness and uniformity of the edge connection profile can be influenced by the backing composition formulation. In an even further aspect, the wear layer and scratch layer can delaminate, melt, or flake off during the edge profile process or when the flooring is installed.

In various aspects, the resilient floor coverings of the present invention advantageously do not exhibit flaking, melting, or delamination during the edge profiling process. In a further aspect, the disclosed resilient floor coverings do not exhibit brittle or weak edge connection profiles.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Example 1

In this Example, backing layers according to the present invention were prepared using the exemplary backing composition formulations provided in Tables 1 and 2.

TABLE 1

| Component Description | Example A % by Wt | Example B % by Wt | Example C % by Wt | Example D % by Wt | Example E % by Wt |
|---|---|---|---|---|---|
| Boral Fly Ash Filler PV20A | 80.0% | 80.0% | 78.0% | 80.0% | 80.0% |
| CaCO3 Filler | 0.0% | 0.0% | 0.0% | 0.0% | 0.0% |
| ENGAGE ™ EG8185 Resin | 20.0% | 15.0% | 20.0% | 10.0% | 5.0% |
| Dow AMPLIFY ™ GR204 Resin | 0.0% | 0.0% | 0.0% | 5.0% | 10.0% |
| PICCOTACT ™ 1115 Tacifier | 0.0% | 5.0% | 0.0% | 5.0% | 5.0% |
| Amorphous Silicate | 0.0% | 0.0% | 0.0% | 0.0% | 0.0% |
| Chopped Fiberglass | 0.0% | 0.0% | 2.0% | 0.0% | 0.0% |

TABLE 2

| Component Description | Example G % by Wt | Example H % by Wt | Example J % by Wt | Example K % by Wt |
|---|---|---|---|---|
| Boral Fly Ash Filler PV20A | 0.0% | 0.0% | 0.0% | 87.0% |
| CaCO3 Filler | 80.0% | 80.0% | 74.0% | 0.0% |
| ENGAGE ™ EG8185 Resin | 20.0% | 15.0% | 19.0% | 13.0% |
| Dow Amplify GR204 Resin | 0.0% | 0.0% | 0.0% | 0.0% |
| PICCOTAC ™ 1115 Tacifier | 0.0% | 0.0% | 5.0% | 5.0% |
| Amorphous Silicate | 0.0% | 0.0% | 2.0% | 0.0% |
| Chopped Fiberglass | 0.0% | 0.0% | 0.0% | 0.0% |

As shown above, the backing compositions can be highly filled, comprising from about 74% to about 87% by weight of filler, for example, fly ash, calcium carbonate and/or amorphous silicate.

Example 2

In this Example, backing layers formed from the exemplary backing compositions were prepared using isobaric double belt presses from two manufacturers: HELD Technologie GmbH (Production Method HD) and Hymmen Industrieanlagen GmbH (Production Method HN) under various temperatures and pressures. The materials were then tested for dimensional stability according to ASTM F2199. The dimensional stability and density results are provided in Tables 3 and 4 below.

TABLE 3

| Production Method HD | Product Properties | | | |
|---|---|---|---|---|
| | Size Change | | Dimension | |
| | Immed Chg [%] | 24 hr Chg [%] | Thickness [mm] | Density [g/cc] |
| Example A | 0.03% | 0.08% | 2.69 | 1.85 |
| Example D | −0.19% | −0.07% | 2.40 | 1.80 |
| Example E | −0.24% | −0.27% | 2.71 | 2.03 |
| Example G | −0.11% | −0.09% | 3.01 | 1.82 |
| Example H | 0.00% | 0.00% | 2.34 | 1.81 |
| Example J | −0.01% | −0.03% | 2.7 | 1.61 |

TABLE 4

| Production Method HN | Product Properties | | | |
|---|---|---|---|---|
| | Size Change | | Dimension | |
| | Immed Chg [%] | 24 hr Chg [%] | Thickness [mm] | Density [g/cc] |
| Example A | 0.00% | 0.00% | 2.82 | 1.84 |
| Example B | −0.02% | 0.00% | 2.95 | 1.96 |
| Example D rolls | −0.23% | −0.13% | 2.82 | 1.81 |
| Example D pellet | −0.13% | −0.03% | 2.18 | 1.97 |
| Example G Low Pressure | 0.41% | 0.36% | 2.76 | 1.86 |
| Example G High Pressure | 0.07% | 0.06% | 2.84 | 1.84 |
| Example H | 0.11% | 0.07% | 2.43 | 1.77 |

As the results show, Examples A, G, H and J, produced using the HD method, are advantageously below the limits of <0.017% dimensionally stable. Examples A, B D, G, H, produced using the HN method, are also advantageously below the limits of <0.017% dimensionally stable.

Example 3

In this Example, exemplary film compositions, which can be used to form the wear layer, were evaluated for abrasion resistance according to ASTM D3884 under testing conditions comprising an H18 wheel, 1000 gram load, and clean each 300 cycles. The film composition parameters and their Taber wear test data are provided in Table 5 below.

TABLE 5

| Film Sample | Thickness [mil] | Gauge | Polymer Type | Taber Test 1 [Cycles] | Taber Test 2 [Cycles] |
|---|---|---|---|---|---|
| Sample 1 | 7 | 700 | PC | 11400 | >20000 |
| Sample 2 | 15 | 1500 | PC | — | >20000 |
| Sample 3 | 7 | 700 | PC | 5000 | 11028 |
| Sample 4 | 7 | 700 | PC | 10000 | 12300 |
| Sample 5 | 12 | 1200 | Polyester TPU | >16000 | — |
| Sample 6 | 15 | 1500 | Polyester TPU | — | >20000 |
| Sample 7 | 15 | 1500 | Polyester TPU | — | >20000 |
| Sample 8 | 15 | 1500 | PET | — | 15000 |
| Sample 9 | 10 | 1000 | PET | — | 8500 |
| Sample 10 | 15 | 1500 | APET | >25000 | — |
| Sample 11 | 20 | 2000 | APET | — | >20000 |
| Sample 12 | 10 | 1000 | PET | >16000 | >20000 |
| Sample 13 | 7.5 | 750 | PET | 19700 | >20000 |
| Sample 14 | 6.34 | 634 | PET | 11500 | >20000 |
| Sample 15 | 10 | 1000 | APET | >20000 | >20000 |
| Sample 16 | 15 | 1500 | PETG/PET/PETG | — | >20000 |
| Sample 17 | 10 | 1000 | PET | — | >20000 |
| Sample 18 | 15 | 1500 | PC | — | >20000 |
| Sample 19 | 14 | 1400 | PET | >20000 | — |
| Sample 20 | 7.87 | 787 | Cellulose Acetate | 3425 | 5416 |
| Sample 21 | 11.8 | 1180 | Cellulose Acetate | 11000 | 10750 |
| Sample 22 | 15.75 | 1575 | PC | 14705 | 14400 |
| Sample 23 | 3 | 300 | PP | 897 | — |
| Sample 24 | 4 | 400 | COC | 1350 | — |
| Sample 25 | 5 | 500 | HS BOPET | 17700 | — |

Example 4

In this Example, resilient floor covering samples comprising a scratch layer were prepared using the methods described herein and tested for scratch and scuff performance. The backing layer was formed from backing composition Example D described in Example 1, and the scratch layer was formed from Nicoat U295365 polyurethane top coating. The samples were tested for micro-scratch resistance pursuant to Martindale Test EN 16094-2012 Test A (MSR-A) and Test B (MSR-B), and "Shaw Scuff" Test. The Shaw scuff test is a modified crock test method for determining abrasion resistance, which compares visual marks of scuffing of hard surfaces using an abrasive pad for a given cycle count. The scratch and scuff test results are provided in Tables 6 and 7 below.

TABLE 6

| Martindale (A & B): | | | | Test Procedure A (Gloss Level) | |
|---|---|---|---|---|---|
| Sample ID | Ri | Rf | Delta R | MSR-A Rtg | Mark |
| C | 17.2 | 13.9 | 19% | 2 | Pass |
| D | 18.8 | 13.8 | 27% | 2 | Pass |
| E | 18.2 | 13.8 | 24% | 2 | Pass |

TABLE 7

| Test Procedure B (Visual) | | | Shaw Scuff | | |
|---|---|---|---|---|---|
| Sample ID | MSR-B Rtg | Mark | Sample ID | Rating | Mark |
| 4 | 2 | Pass | C | 400 | Pass |
| 5 | 3 | Pass | — | — | — |
| 6 | 4 | Fail | — | — | — |

As the results show, the scratch layer was able to achieve good resistance to scratch and scuff testing.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A resilient floor covering, comprising:
   a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler;
   a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and
   a wear layer having an exposed outer surface portion configured for exposure to the ambient environment and an opposed bottom surface configured to substantially overlie the decorative portion of the floor covering;
   wherein the wear layer exhibits an abrasion resistance greater than 5000 cycles when measured according to ASTM D3884 under testing conditions comprising an H18 wheel, 1000 gram load, and clean every 300 cycles;
   wherein the exposed outer surface of the wear layer exhibits a micro-scratch resistance characterized by of a gloss change rating in the range of 1 to 3 when measured pursuant to Martindale Test EN 16094-2012 Test A (MSR-A) and Test B (MSR-B);
   wherein the resilient floor covering does not comprise polyvinyl chloride (PVC) material, and
   wherein the at least one backing layer of the backing portion comprises a first backing layer, a second backing layer, and a secondary backing layer.

2. The resilient floor covering of claim 1, wherein the backing composition comprises an ethylene-octene copolymer.

3. The resilient floor covering of claim 2, wherein the backing composition comprises between about 65% to about 95% by weight of the filler.

4. The resilient floor covering of claim 2, wherein the backing composition comprises between about 75% to about 85% by weight of the filler.

5. The resilient floor covering of claim 1, wherein the secondary backing layer of the at least one backing layer defines the bottom surface of the backing portion and wherein the first backing layer of the at least one backing layer defines the top surface of the backing portion.

6. The resilient floor covering of claim 1, wherein the first and second backing layers are configured to substantially overlie the secondary backing layer.

7. The resilient floor covering of claim 1, wherein the secondary backing layers comprise at least one of: oriented polypropylene (OPP), woven polyethylene (PE), nonwoven polyethylene (PE), woven polypropylene (PP), nonwoven polypropylene (PP), woven polyethylene (PET), nonwoven polyethylene terephthalate (PET), woven nylon, or nonwoven nylon.

8. The resilient floor covering of claim 1, wherein the secondary backing layers comprises at least one of: nonwoven fiberglass, woven fiberglass, recycled fiber shoddy, polyethylene terephthalate (PET) film, polypropylene (PP) film, polyethylene (PE) film, LLDPE film, polystyrene copolymer, polypropylene-polyethylene (PP-PE) copolymer, polyolefin elastomer, or polyurethane.

9. The resilient floor covering of claim 1, wherein the secondary backing layer comprises an embossed pattern.

10. The resilient floor covering of claim 1, wherein the backing portion further comprises a fiberglass layer positioned therebetween the first and second backing layers.

11. The resilient floor covering of claim 10, wherein the fiberglass layer has a weight in the range of from about 20 to about 90 gram/m$^2$.

12. The resilient floor covering of claim 1, wherein the backing composition further comprises chopped fiberglass.

13. The resilient floor covering of claim 1, wherein the ink layer defines the top surface of the decorative portion.

14. The resilient floor covering of claim 1, wherein the ink layer comprises at least one ink selected from a group consisting of: water based, soy-based, or solvent-based pigments.

15. The resilient floor covering of claim 1, wherein the wear layer is positioned adjacent to the decorative portion such that the top surface of the decorative portion contacts the bottom surface of the wear layer.

16. The resilient floor covering of claim 15, wherein the wear layer comprises at least one of: polyethylene terephthalate (PET), polyurethane, polypropylene, polytrimethylene terephthalate (PTT), Nylon 6, or Nylon 6,6.

17. The resilient floor covering of claim 15, wherein the wear layer comprises at least one of: heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), or a copolymer thereof.

18. The resilient floor covering of claim 15, wherein the wear layer has a thickness of from about 4 mil to about 30 mil.

19. The resilient floor covering of claim 1, further comprising at least one tie layer, wherein the at least one tie layer is configured to be positioned between opposing layers of the resilient floor covering to bond otherwise dissimilar materials that form the otherwise opposing layers of the floor covering together.

20. The resilient floor covering of claim 19, wherein one or more tie layers of the at least one tie layer are positioned therebetween the bottom surface of the wear layer and the top surface of the decorative portion of the floor covering.

21. The resilient floor covering of claim 19, wherein one or more tie layers of the at least one tie layer are positioned therebetween the bottom surface of the decorative portion and the top surface of the backing portion.

22. The resilient floor covering of claim 19, wherein the tie layer comprises at least one of: water borne extrusion coating primers, polyethyleneimine (PEI), conventional acrylic materials, maleic anhydride (MAH), ethylene-methyl acrylate (EMA), or ethylene-vinyl acetate (EVA).

23. The resilient floor covering of claim 19, wherein the tie layer comprises at least one of: ethylene-acrylic acid (EAA), ethylene-acrylic acid-maleic anhydride (EAA-MAH), ethylene-methyl acrylate-maleic anhydride (EMA-MAH), ethylene-vinyl acetate-maleic anhydride (EVA-MAH), low density polyethylene-maleic anhydride (LDPE-MAH), high density polyethylene-maleic anhydride (HDPE-MAH), polyurethane (PUR), polyurethane dispersion (PUD), or acrylic.

24. The resilient floor covering of claim 1, wherein the decorative portion comprises a decorative layer.

25. The resilient floor covering of claim 24, wherein the decorative layer comprises at least one of: oriented polypropylene (OPP), polyolefin (PO), woven polyethylene (PE), nonwoven PE, woven polypropylene (PP), nonwoven PP, woven PET, nonwoven PET, woven nylon, nonwoven nylon, conventional papers, conventional foils, or filled oriented polypropylene (OPP).

26. The resilient floor covering of claim 24, wherein the decorative layer comprises at least one of: heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), or a copolymer thereof.

27. The resilient floor covering of claim 24, wherein the decorative layer has a thickness of about 1 mil to about 8 mil.

28. The resilient floor covering of claim 25, wherein the decorative layer comprises a film.

29. The resilient floor covering of claim 28, wherein the film is a three-layer film comprising a top skin, a central core, and a bottom skin, wherein the ink layer overlies the top skin of the three-layer film, wherein the central core is positioned between the top skin and the bottom skin, and wherein the bottom skin of the three-layer film defines the bottom surface of the decorative portion of the floor covering.

30. The resilient floor covering of claim 29, wherein the top skin of the three-layer film is compatible with the material of the ink layer, wherein the bottom skin of the three-layer film is compatible with the material of the first backing layer, and wherein the central core of the three-layer film comprises a substantially opaque material.

31. The resilient floor covering of claim 1, wherein the backing composition further comprises post-industrial carpet or post-consumer carpet material.

32. The resilient floor covering of claim 1, wherein the polyolefin elastomer comprises a polyethylene elastomer, a polypropylene elastomer, or a copolymer of propylene and ethylene, or a combination thereof.

33. The resilient floor covering of claim 1, wherein the polyolefin elastomer is a copolymer of propylene and ethylene.

34. The resilient floor covering of claim 33, wherein the propylene content of the copolymer is at least about 80%.

35. The resilient floor covering of claim 1, wherein the filler comprises calcium carbonate, fly ash, coal fly ash, wollastonite, silica, wood, glass, kaolin, clay, mica, titanium dioxide, recycled fines, fiberglass, diatomaceous earth, talc, lime, barite, graphite carbon, composites of post-industrial carpet, or composites of post-consumer carpet, or a combination thereof.

36. The resilient floor covering of claim 1, wherein the resilient floor covering exhibits a static load limit indentation depth in the range of from 0 inches to 0.09 inches as measured pursuant to ASTM F970 under conditions of: 250 lb. static load for 24 hours, recover of 24 hours, and 1.125 inch outside diameter probe.

37. The resilient floor covering of claim 1, wherein the resilient floor covering exhibits a dimensional stability of less than about 0.17% as determined by ASTM F2199-0 at 82° C. and 24 hr.

38. The resilient floor covering of claim 1, wherein the resilient floor covering exhibits a dimensional stability characterized by an amount of doming or curling in the range of from 0 to no more than 3/32" of an inch when subjected to test conditions of ASTM F2199-0 at 82° C. and after 24 hr.

39. The resilient floor covering of claim 1, wherein the backing composition comprises from about 10 to about 50 wt % polymer based on the total weight of the backing composition.

40. The resilient floor covering of claim 1, wherein the polymer comprises from about 50 to about 100 wt % polyolefin based on the total weight of polymer.

41. A resilient floor covering, comprising:
a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler;
a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and
a wear layer having an exposed outer surface portion configured for exposure to the ambient environment and an opposed bottom surface configured to substantially overlie the decorative portion of the floor covering,
wherein the resilient floor covering exhibits a short term residual indentation depth in the range of from 0 inches to 0.09 inches as measured pursuant to ASTM F1914 under conditions of: 140 lb. load for 10 minutes, and recover for 60 minutes;
wherein the resilient floor covering does not comprise polyvinyl chloride (PVC) material, and
wherein the at least one backing layer of the backing portion comprises a first backing layer, a second backing layer, and a secondary backing layer.

42. A resilient floor covering, comprising:
a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler;
a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering, wherein the exposed outer surface portion of the wear layer further comprises a scratch layer;

wherein the resilient floor covering does not comprise polyvinyl chloride (PVC) material, and wherein the at least one backing layer of the backing portion comprises a first backing layer, a second backing layer, and a secondary backing layer.

43. A resilient floor covering, comprising:

a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising polyolefin elastomers and a filler;

a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering, wherein the resilient floor covering exhibits a change in dimensional stability of less than about 0.17% as determined by ASTM F2199-0 at 82° C. and 24 hrs recovery;

wherein the resilient floor covering does not comprise polyvinyl chloride (PVC) material, and wherein the at least one backing layer of the backing portion comprises a first backing layer, a second backing layer, and a secondary backing layer.

44. A resilient floor covering, comprising:

a backing portion having a top surface and an opposing bottom surface configured to substantially abut the floor when the resilient floor covering is placed in a selected orientation, and wherein the backing portion comprises at least one backing layer, wherein the at least one backing layer of the backing portion comprises a backing composition comprising a homogeneously branched ethylene polymer and a filler;

a decorative portion having a top surface and an opposing bottom surface, wherein the decorative portion is configured to overlie the backing portion such that the top surface of the backing portion contacts the bottom surface of the decorative portion, and wherein the decorative portion comprises an ink layer; and a wear layer having an exposed outer surface portion configured for exposure to the ambient environment and an opposed bottom surface configured to substantially overlie the decorative portion of the floor covering;

wherein the resilient floor covering does not comprise polyvinyl chloride (PVC) material, and wherein the at least one backing layer of the backing portion comprises a first backing layer, a second backing layer, and a secondary backing layer.

* * * * *